United States Patent
Chin et al.

(10) Patent No.: US 7,464,054 B2
(45) Date of Patent: Dec. 9, 2008

(54) PROVIDING CUSTOMS INFORMATION

(75) Inventors: Allen Chin, Staten Island, NY (US); Lynn Ann Casey, Vienna, VA (US); Lisa M. Mascolo, Alexandria, VA (US); Seon G. Yi, Washington, DC (US)

(73) Assignee: Accenture LLP, Palo Alto, CA (US)

( * ) Notice: Subject to any disclaimer, the term of this patent is extended or adjusted under 35 U.S.C. 154(b) by 933 days.

(21) Appl. No.: 09/796,277

(22) Filed: Feb. 28, 2001

(65) Prior Publication Data

US 2002/0120561 A1    Aug. 29, 2002

(51) Int. Cl.
G06Q 40/00    (2006.01)
(52) U.S. Cl. .............................. 705/37; 705/38; 705/36; 705/5
(58) Field of Classification Search .................... 705/38, 705/36, 37, 34, 35, 5
See application file for complete search history.

(56) References Cited

U.S. PATENT DOCUMENTS 6,584,466 B1 *   6/2003   Serbinis et al. ............... 707/10

2002/0010665 A1 *  1/2002  Lefebvre et al. .............. 705/31

FOREIGN PATENT DOCUMENTS

| GB | 2 344 908 | | 6/2000 |
| GB | 2344908 | * | 6/2000 |
| WO | WO 94/00936 | | 1/1994 |
| WO | WO 00/29995 | | 5/2000 |
| WO | WO 00/38095 | | 6/2000 |

OTHER PUBLICATIONS

How Proper Planning Minimizes Customs Duties Neville, Mark K., Jr., Ellis, Paul R.. The Journal of European Business. New York: Jul./Aug. 1992. vol. 3, Iss. 6; p. 40, 6 pgs).*
International Application No.: EP 02 251 423.6-2221 Search and Examination Report dated Dec. 21, 2004; 4 pages.

* cited by examiner

Primary Examiner—Frantzy Poinvil
Assistant Examiner—Clement Graham
(74) Attorney, Agent, or Firm—Fish & Richardson P.C.

(57) ABSTRACT

A method comprising receiving information that establishes an identity of a user, and providing on-line access to customs information from an account-based database.

28 Claims, 42 Drawing Sheets

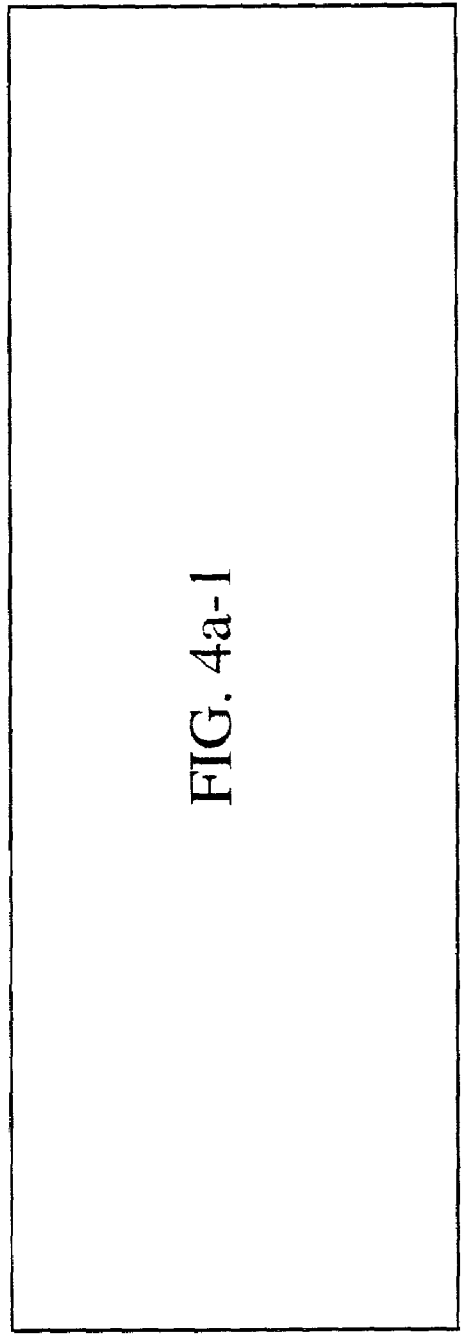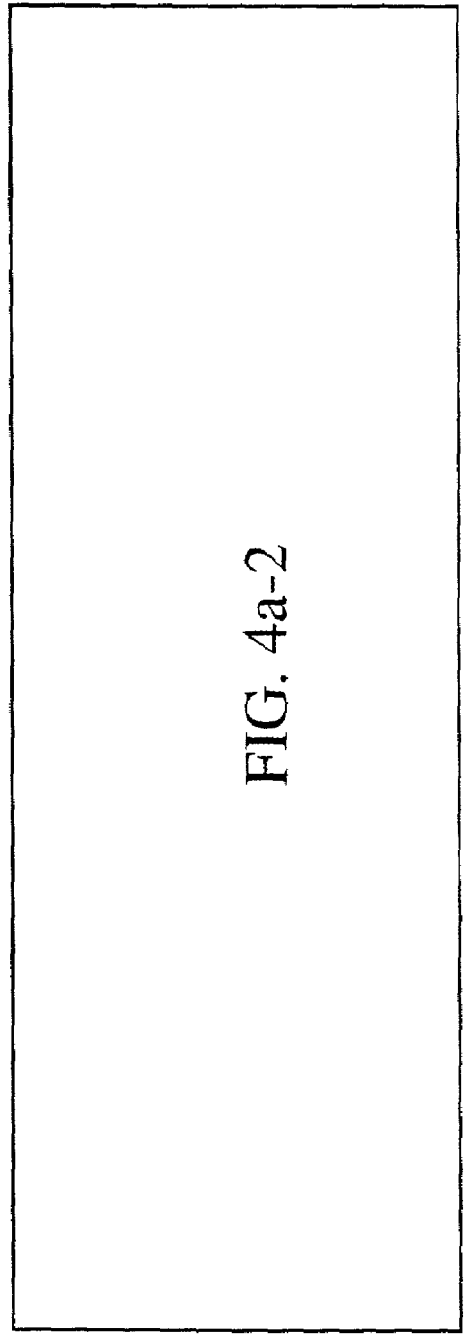
FIG. 4

FIG. 5e

New User Registration

New User Registration

Mandatory data fields are indicated with an *

- *First Name
- Middle Name
- *Last Name
- *Address 1
- Address 2
- *City
- *State/Province
- *Zip
- *Country — United States
- Title
- Phone
- *E-mail Address

Functional Roles

- ☐ Add, Modify, and Delete
- ☐ Payment
- ☐ Filing
- ☐ Refund

Sidebar:
- Back to CC Home
- View Importer List
- View Account List
- File a Cargo Release
- File an Entry Summary
- Settle Accounts
- Query Import Data/Reports
- Check Mailbox
- Rules and Regulations
- About CC
- Logoff CC accenture
Confidential and Proprietary

U.S. Customs Service
May 17, 2000

— 212

File an Entry Summary

File an Entry Summary

| Account Number | | Exporting Country |
| Entry Number | | Export Date |
| Entry Type Code | | Country of Origin |
| Entry Summary Date | | Missing Documents |
| Entry Date | | I.T. Number |
| Bond Number | | I.T. Date |
| Bond Type Code | | B.L. or A.W.B.# |
| Consignee Number | | Manufacturer ID |
| Importing Carrier | | |
| Location of Goods/G.O. Number | | |
| Foreign Port of Lading | | |
| Importer of Record Name and Address | | |
| Ultimate Consignee Name and Address | | |

View Importer List
View Account List
File a Cargo Release
File an Entry Summary
Settle Accounts
Check Mailbox
Inquire on Rules and Regulations
About eCS
Logoff

FIG. 5r

PROVIDING CUSTOMS INFORMATION

BACKGROUND

The invention relates to providing access to customs information.

The United States Customs Service is the primary enforcement agency responsible for protecting the nation's borders. Among other things, the U.S. Customs Service examines imports into the country and collects any duty, fees, or taxes. They inspect imports to ensure compliance with rules related to public health, safety, protection of intellectual property rights, etc., that may have been promulgated by other government agencies, such as the Food & Drug Administration, the Department of Agriculture, the Environmental Protection Agency, the Alcohol, Tobacco & Firearms, the Coast Guard, or the Department of Transportation.

The U.S. Customs Service typically processes imports on a transactional basis, rather than an account basis. They interact with many different parties, including importers, customs brokers, suppliers, carriers/freight forwarders, surety agents, bankers, and others to process these transactions. The different parties may also interact with each other to process a single transaction.

Due to the complex nature of U.S. Customs Service rules, extensive communication among interested parties may be required. Adhering to the rules and regulations and tracking the many import transactions that are processed daily are challenging tasks for all parties involved.

SUMMARY OF THE INVENTION

Presented is a technique for providing accurate, real-time customs information to all interested parties. Various implementations of the invention may include one or more of the following features.

In a broad aspect, the present invention provides a method that includes receiving information to establish a user's identity, and providing on-line access to customs information from an account-based database.

The aforesaid method may include either receiving a password to establish a user's identity or deriving information from an electronically recognizable card to establish a user's identity. The method may further include providing access to a periodic account statement and enabling modification of the format of the periodic account statement. The aforesaid method may also include provisions for allowing the filing of customs forms online. The aforesaid method may further include providing access to customs information from a database that is not account based.

In a second broad aspect, the invention includes a machine-based method comprising obtaining import transaction data, organizing the import transaction data into an account-based format, storing the import transaction data in an account-based database, and providing interactive access to the account-based database over a duplex communications channel. The aforesaid machine-based method may further include limiting access to an accessible portion of the account-based database, where a user's identity determines the accessible portion. The aforesaid machine-based method may further include processing at least payment receipt and refund request financial transactions. The aforesaid machine-based method may also include providing access to a modifiable periodic account statement. The aforesaid machine-based method may also include enabling customs forms to be filed and for automatically calculating required payments. The aforesaid machine-based method may also include providing limited access to a broker information database, and to an importer information database, and to a bond information database. The aforesaid machine-based method may further include enabling modification of details of the account-based format. The aforesaid machine based method also may be accomplished using a packet-switched, publicly accessible communications channel. In another broad aspect, the present invention provides, a system having a memory unit and a processor. The processor is configured to obtain import transaction data; organize the import transaction data into an account-based format for storage in a database in the memory unit; and to provide access to the database, interactively over a duplex communications channel. The processor in the aforesaid system may be further configured to limit access over said channel to an accessible portion of the database and the accessible portion may be determined based on information that establishes the identity of a user. The processor in the aforesaid system may be further configured to process at least payment receipt and refund request financial transactions and provide access to a modifiable periodic account statement. The processor in the aforesaid system may be further configured to enable a user to file customs forms and further configured to automatically calculate required payments. The processor in the aforesaid system may be further configured to provide limited access to a broker information database in the memory unit, an importer information database in the memory unit, and a bond information database in the memory unit. The processor may be further configured to enable a user to modify details of the account-based format.

In yet another broad aspect, the present invention provides an article comprising a computer-readable medium that stores computer executable instructions for causing a computer system to obtain import transaction data, organize the import transaction data into an account-based format, store the import transaction data in an account-based database, and provide access to the account-based database, interactively over a duplex communications channel. The aforesaid article may contain further instructions for causing the computer system to limit access over the channel to an accessible portion of the account-based transaction database. The aforesaid article may contain further instructions for causing the computer system to process at least payment receipt and refund request financial transactions. The aforesaid article may contain further instructions for causing the computer system to provide access to a periodic account statement and enable modification of the format of the periodic account statement. The aforesaid article may contain further instructions for causing the computer system to enable customs forms to be filed. The aforesaid article may contain further instructions for causing the computer system to provide limited access to a broker's information database, an importer's information database, and a bond information database. The aforesaid article may contain further instructions for causing the computer system to modify details of the account-based format.

DETAILED DESCRIPTION OF THE DRAWINGS

Figure 1:
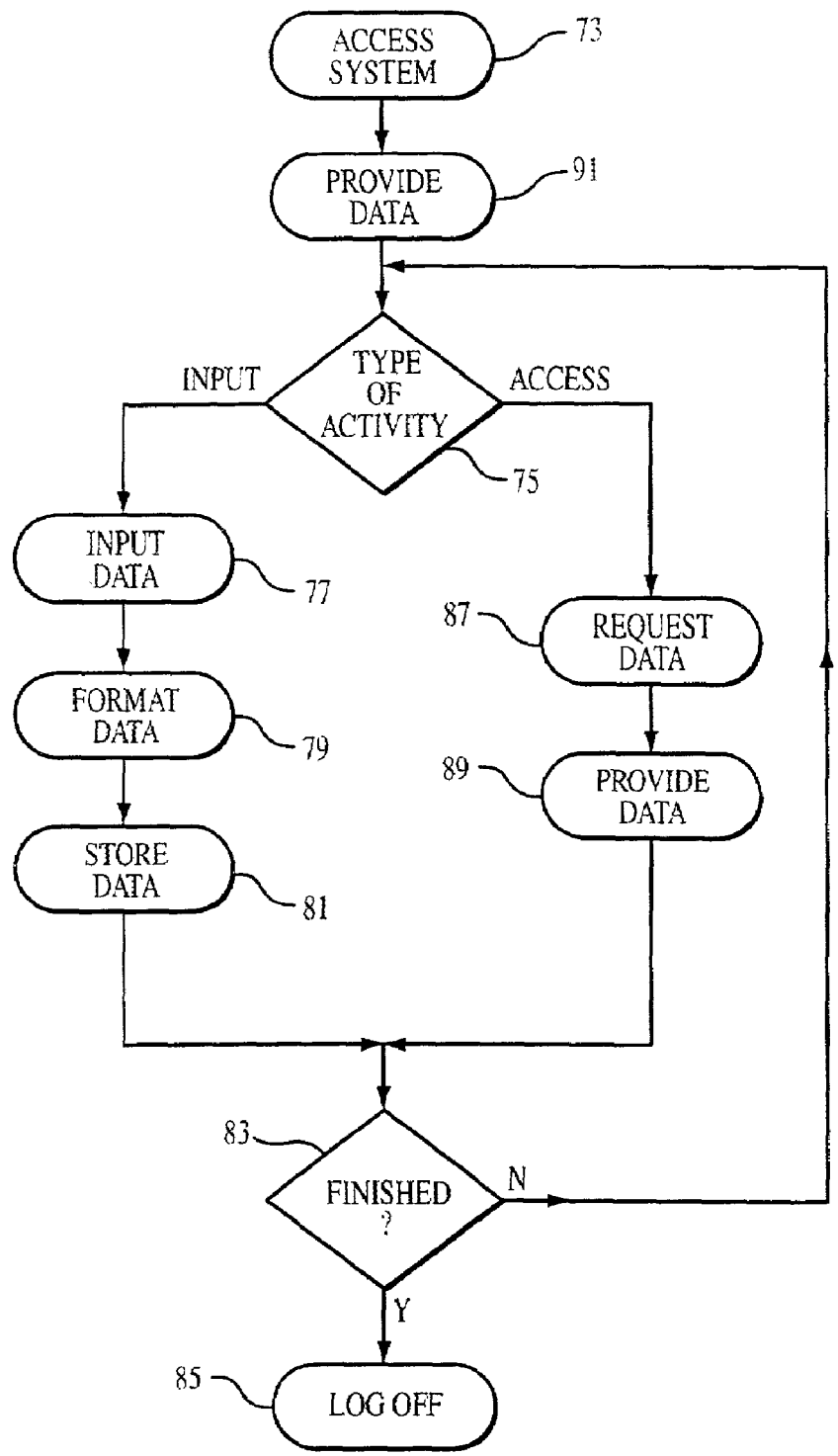
FIGS. 1, & 4a-4j are flowcharts.

In FIG. 1, a user may access 73 a computer system either by entering a password or by any other convenient method. The computer system then displays a first screen which provides 91 certain data to the user. The computer system determines 75 whether the user wants to input data or access other data. This determination 75 may be made either through selections of links on a website by a user or by some other appropriate means.

If the computer system determines that the user wants to input data, the user is prompted to input 77 data. The user may input 77 data by filing, for example, an Entry Summary Document, a Cargo Release Form, or a Refund Request form. After the user inputs 77 the data, the computer system formats 79 the data into an account-based format or into any other useful format.

Formatting data into an account-based format enables data related to discrete transactions to be consolidated into distinct categories and processed at an account level, rather than at a transaction level. Accounts can be created for importers who do business with the U.S. Customs Service. An importer can have more than one account, and may choose how to create these accounts. For example, a particular importer may create an account based on a particular type of product being imported or on a particular port of entry.

For each account created, an importer can have a different relationship with customs brokers. An importer may use several different customs brokers for the same account, if needed. The system can determine which of an importer's accounts a particular customs broker is allowed to access. An importer might authorize a customs broker to access information for an account the customs broker is directly responsible for.

A customs broker may also be authorized to create new accounts for an importer. The computer system may implement measures to prevent two duplicate accounts from being inadvertently created by both an importer and a customs broker. The system may also provide monthly, quarterly, or other periodic statements of the activity in each account.

Figure 2:
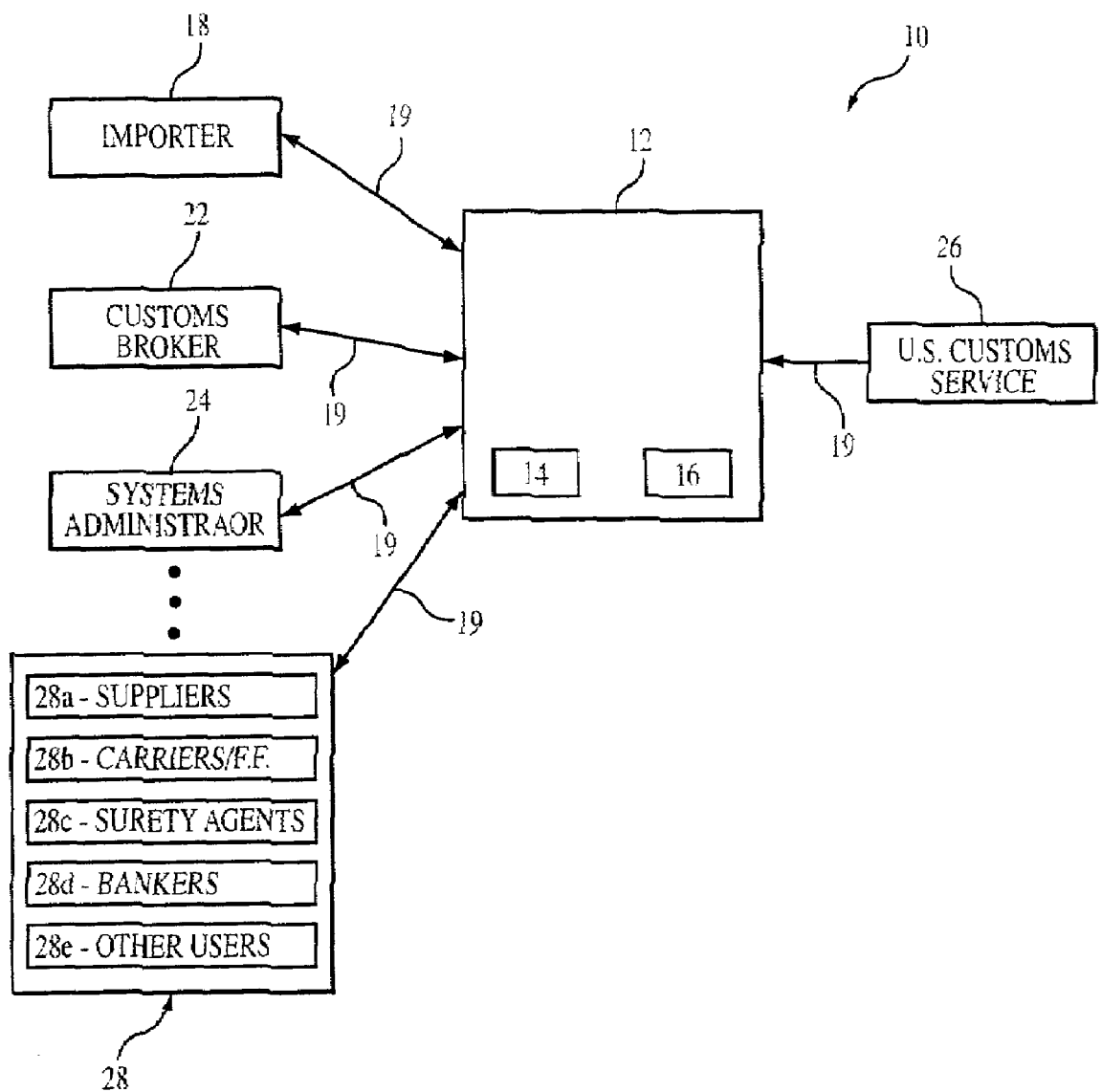
FIGS. 2 & 3 are block diagrams.

After formatting 79 the data, the computer system stores 81 the data in a memory unit 16 (FIG. 2). The system then determines 83 whether the user is finished accessing the system. If the user is finished, the user logs off 85.

If the user is not finished, the computer system determines 75 what type of activity the user requires. If the user then wishes to access data in the database, the user requests 87 the data, and the system provides 89 the requested data (if the user has access to that portion of the system). The user may request, for example, the balance due on an account, a list of transactions for an account, information related to U.S. Customs Rules and Regulations, or other import related data. After providing 89 the data, the system again makes a determination 83 as to whether the user is finished accessing the system. All determinations, inputting, providing of data, etc., may be accomplished based on a user's selection of various links on a website.

In FIG. 2, a system 10 includes a computer system 12 accessible by a plurality of users. The computer system 12 may be an Internet-based system. The computer system 12 includes a processor 14 and a memory unit 16. The processor 14 is typically configured to organize inputted data into an account-based format and to perform other processing functions, as required. The memory unit 16 is configured for storing the account-based formatted data and other import related information.

Importers 18 are one kind of user connected to the computer system 12. Importers 18 may either access data on the computer system 12 or input data to the computer system 12 over a duplex communications channel 19. The duplex communications channel 19 may be, for example, a direct line connection, a wireless connection or a connection using the Internet.

Importers 18 are key participants in the importing process. Typically, they engage other participants (e.g., brokers, bankers, suppliers, or transportation companies) to transport goods from foreign countries into the United States. Importers 18 typically face significant financial risk if any of the participants in the import process make an error.

Importers 18 can vary greatly in size. The size of a particular importer 18 may influence the way it processes import transactions. For example, a large importer 18, such as an automobile company, may have very sophisticated import processes in place. They may perform some or all of their import transactions in-house (i.e. without relying on a customs broker). On any given day a particular importer 18 might transport millions of dollars of goods into the country. They also might utilize several different methods to transport goods including air, land, and sea shipments. Small importers 18, on the other hand, might rely heavily on customs brokers to handle the transportation of goods into the country. Importers 18 generally pay a fee to customs brokers for this service. Regardless of an importer's 18 size, the outcome of the import process typically has a major impact on the success of an importer 18. Therefore, it is desirable for importers 18 to stay well informed regarding their import transactions and how to best comply with the various import laws and regulations.

A customs broker 22 is another user that is connected to the computer system 12. Customs brokers 22 may either access data on the computer system 12 or input data to the computer system 12 over a duplex communications channel 19. Customs brokers 22 are licensed representatives of importers 18 and can represent them in any or all phases of an import transaction.

Customs brokers 22 are sometimes affiliated with freight forwarders, and often provide transportation assistance to both foreign suppliers and importers 18. Import paperwork can be very detailed and tedious, and customs brokers 22 can have up to several thousand importers as clients. Customs brokers 22 often tend to specialize in importing specific commodities. Therefore, an importer 18 of diverse goods may hire several different customs brokers 22.

The relationship between an importer 18 and a customs broker 22 can vary considerably from one transaction to the next. For example, a given importer 18 may decide to import some goods on its own, then request one customs broker 22 to assist in importing other goods, and then request a second customs broker 22 to assist in importing yet other goods.

A systems administrator 24 is another user that is connected to the computer system 12. Each organization that uses the system (e.g. importers 18, customs brokers 22, etc.) will typically have a designated systems administrator 24. The systems administrator 24 handles requesting and obtaining access to the computer system 12 for others in his organization. The systems administrator 24 typically only has access to the new user registration functions of the system, but may have access to other areas of the system, if required. For example, if a systems administrator 24 were also the head of an organization's trade compliance division he would probably be granted access to both system administrator functions as well as other system functions.

The U.S. Customs Service 26 is another user that is connected to the computer system 12. The U.S. Customs Service 26 is responsible for examining all U.S. imports as well as for collecting duty, fees, and taxes. The U.S. Customs Service 26 would generally be the publisher of the information on the computer system 12, as well as the decision maker on all entry transactions (i.e. whether a particular cargo shipment is authorized for release or requires examination, etc.). The U.S.

Customs Service 26 may have access to various computer system 12 functions and information.

Other participants 28 in the import process can be connected to the computer system 12. These other participants 28 may include, for example, suppliers 28*a*, carriers/freight forwarders 28*b*, surety agents 28*c*, bankers 28*d* and other users 28*e*. These other participants 28 may use the computer system 12 for inputting and/or accessing various importing related information.

Suppliers 28*a* sell goods to importers 18. Generally, an import transaction is initiated by establishing a contract between an importer 18 and a supplier 28*a* from a foreign country. Such a contract may include specifications detailing the product, quantity, price, delivery approach, liability, and payment method for a particular import transaction. The supplier 28*a* also provides a commercial invoice to the importer 18, which is used to file entry summary documents. Suppliers 28*a* may have access to various computer system 12 functions and information.

Carriers/freight forwarders 28*b* are responsible for the shipment of goods. A carrier/freight forwarder 28*b* may provide information to an importer 18 needed to file entry summary documents and help determine the valuation of goods. Such information may include, packing lists, air waybills and bills of lading. Carriers/freight forwarders 28*b* may have access to various features and information in the computer system 12.

Surety agents 28*c* issue surety bonds to cover import transactions into the country. The parties to an importation agreement typically include an importer 18, a surety agent 28*c*, and the U.S. Customs Service 26. The surety agent 28*c* guarantees that if the importer 18 does not comply with applicable laws and regulations, a pre-determined amount of money will be given to the U.S. Customs Service 26 by the surety agent 28*c*. The surety agent 28*c* therefore has an interest in the success of the import process, and may have access to various features and information in the computer system 12.

Bankers 28*d* often provide financing for an importer's 18 inventory. A banker 28*d* may also help importers 18 find reputable overseas suppliers 28*a* through his banking correspondence network. A banker 28*d* may also help an importer 18 qualify overseas suppliers 28*a* and prepare purchase orders. Thus, bankers 28*d* also have an interest in the success of the import process and may have access to various features and information in the system.

Other users 28*e* may also be connected to the computer system 12. Other users 28*e* can include any other individuals or organizations that might have an interest in or play a role in processing import transactions.

Figure 3:
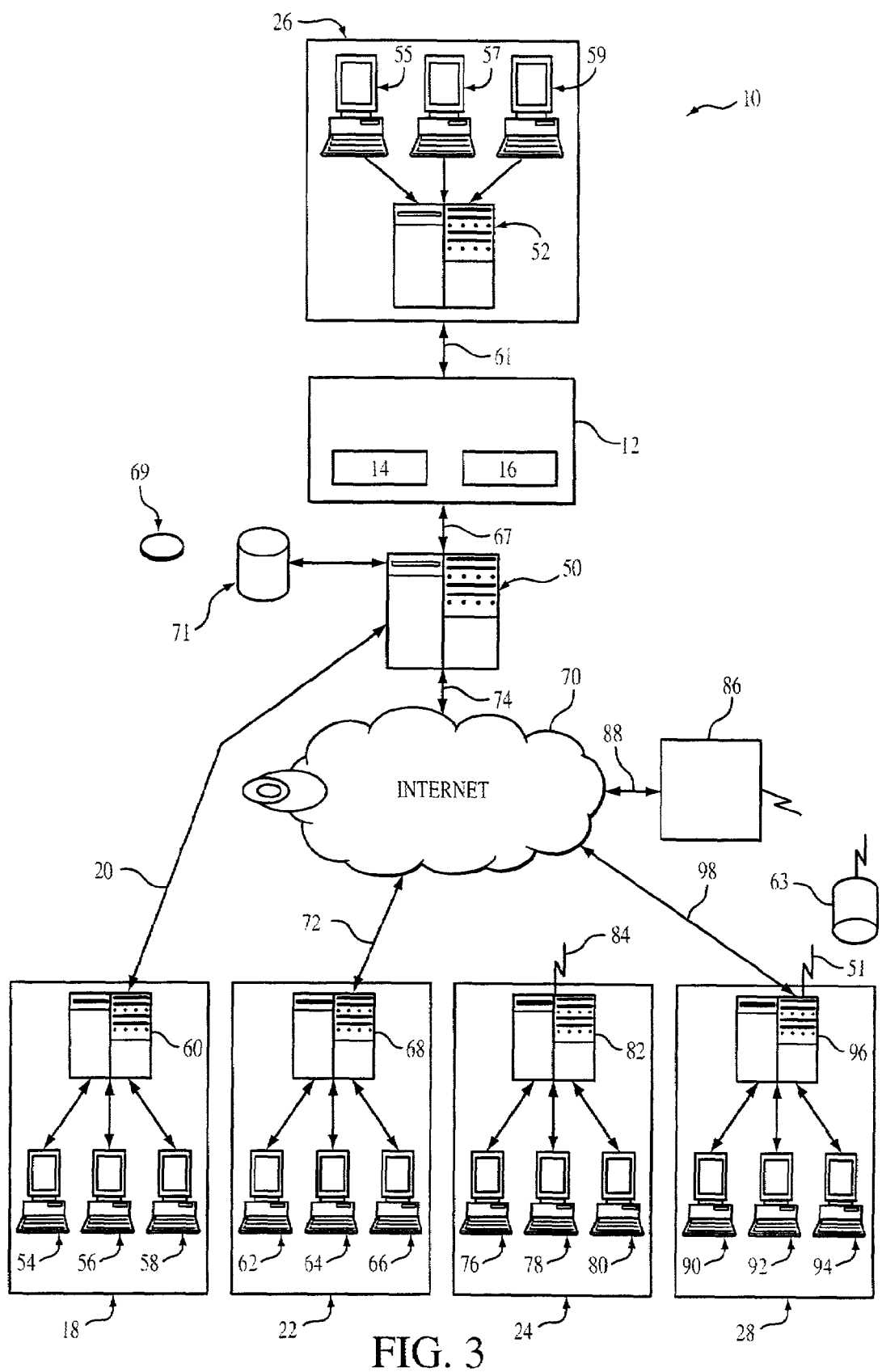

As shown in FIG. 3 multiple users can access a computer system 12 substantially simultaneously. In particular, server computers 50 and 52 are connected via lines 67 and 61 to computer system 12, which may be a large mainframe computer or which may include interconnected microprocessors for accessing, calculating, organizing, and otherwise processing information.

The computer system 12 includes a processing unit 14 and a memory unit 16. The computer system 12 may contain the required hardware and software to process data and provide results to either server 50 or server 52. Alternatively, a computer-readable medium, such as a disk 69, might store computer executable instructions for causing the computer system 12 to implement the techniques described herein. The disk 69 could be inserted into a disk drive 71 connected to the computer system 12. The memory unit 16, in the computer system 12, stores databases of import information. The memory unit 16 may also include space for storing web pages to be accessed and viewed substantially simultaneously by multiple users. The described interconnections and processing functions of server computer 50, server computer 52, and computer system 12 are merely exemplary, and may be varied to suit specific processing requirements and/or other considerations. For example, an implementation might be possible in which one computer unit is utilized to perform all of the functions of server computer 50, server computer 52, and the computer system 12.

FIG. 3 illustrates a variety of ways to connect different users to the computer system 12. An importer 18 has multiple workstation computers 54, 56, 58 connected to a common server computer 60. The work station computers 54, 56, 58 can communicate with each other and with the server computer 60. The server computer 60 has a direct line connection 20 to the server computer 50 so the users at the workstation 60 computers 54, 56, 58 can quickly access data from the server computer 50.

A customs broker 22 also has multiple workstation computers 62, 64, 66 connected to a common server computer 68, which is connected to the Internet 70 via line 72. The server computer 68 could belong to an Internet Service Provider that charges users a fee to access the Internet 70, or the server computer 68 could belong to another type of organization that has a direct connection to the Internet 70. Users of workstation computers 62, 64, 66 can access data on the server 50 through line 72, the Internet 70, and line 74.

An organization's systems administrator 24 has multiple workstation computers 76, 78, 80 connected to a common server computer 82 that has a wireless connection 84 to a wireless transceiver device 86, which may be a server, connected via line 88 to the Internet 70.

Other users 28 with multiple workstation computers 90, 92, 94 are connected to a common server 96, having multiple methods available communicate with the server 50. The server 96 may be connected to the Internet 70 via direct line 98, and may also utilize a wireless connection 51 to the wireless transceiver device 86.

The U.S. Customs Service 26 also has multiple of workstation computers 55, 57, 59 connected to a server 52. Server 52 has a direct line connection 61 to the computer system 12. A user having a personal digital assistant (PDA) 63 (e.g. a palm pilot) may use a wireless connection 65 from the PDA 63 to the Internet 70 via the wireless transceiver device server 86 and line 88. The described interconnections of the various workstation computers to the computer system 12 are merely exemplary, and may be varied to suit a particular user's requirements.

Figures 1, 4A:
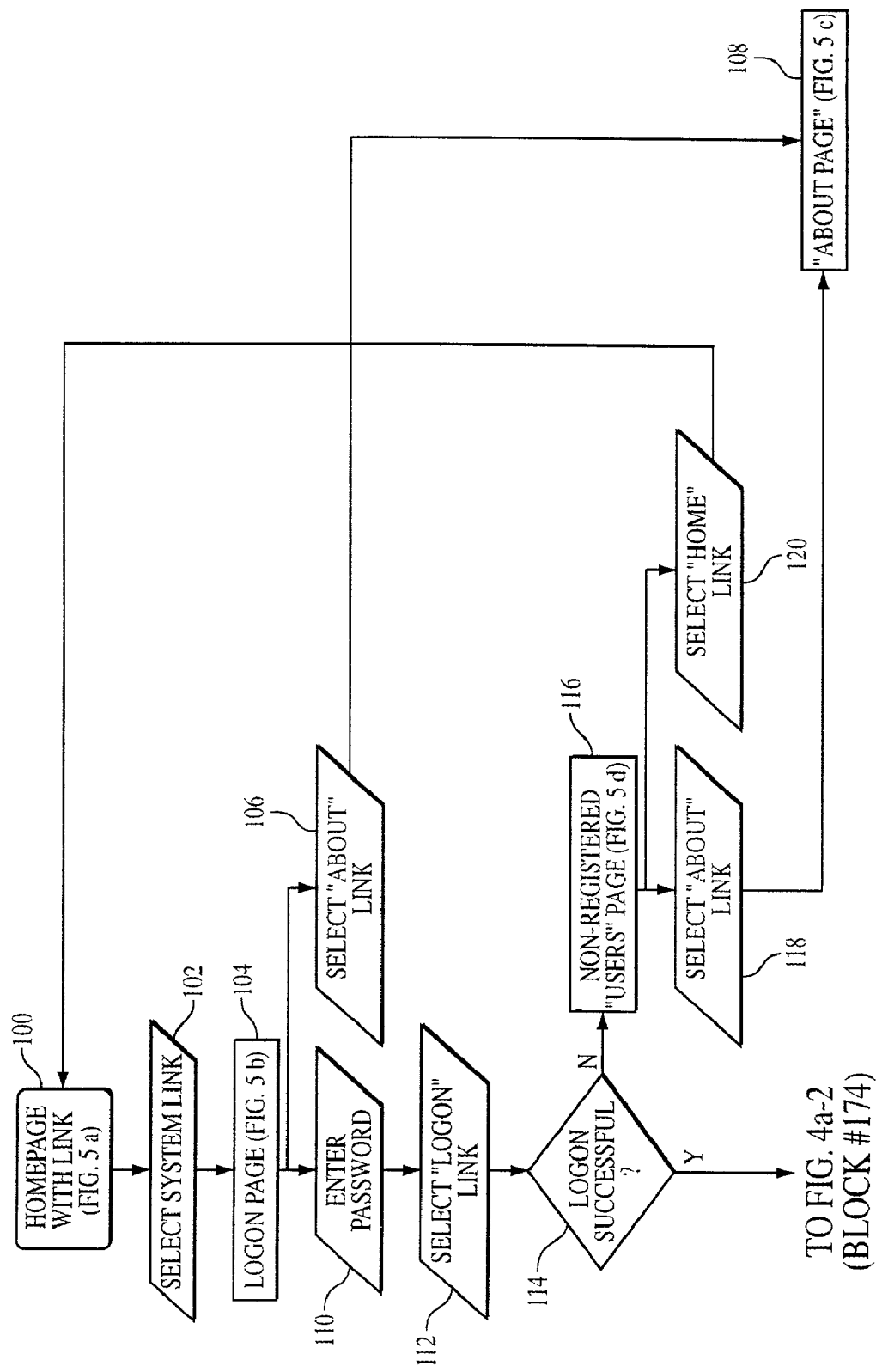
Figures 2, 4A:
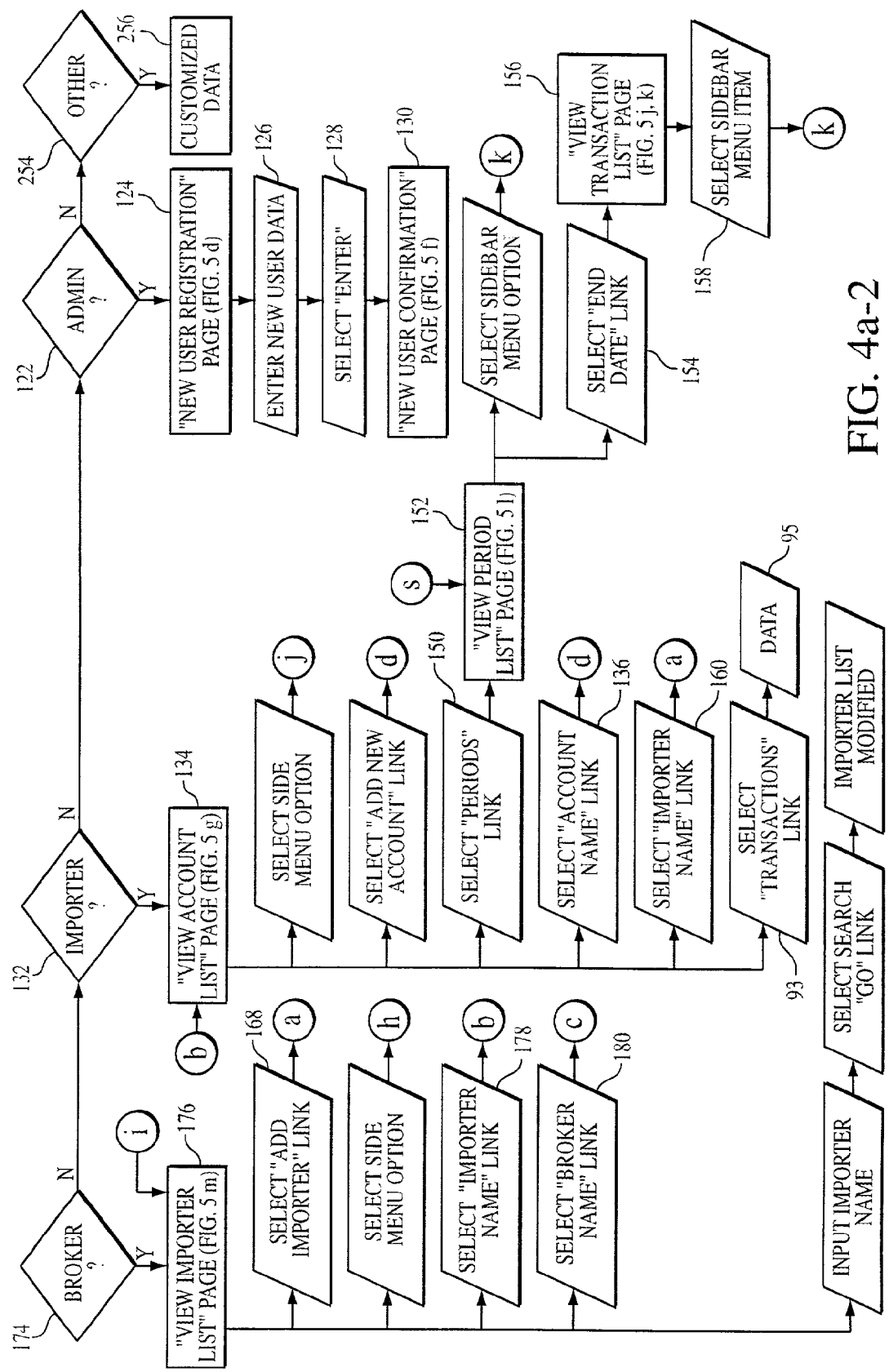
Figure 4B:
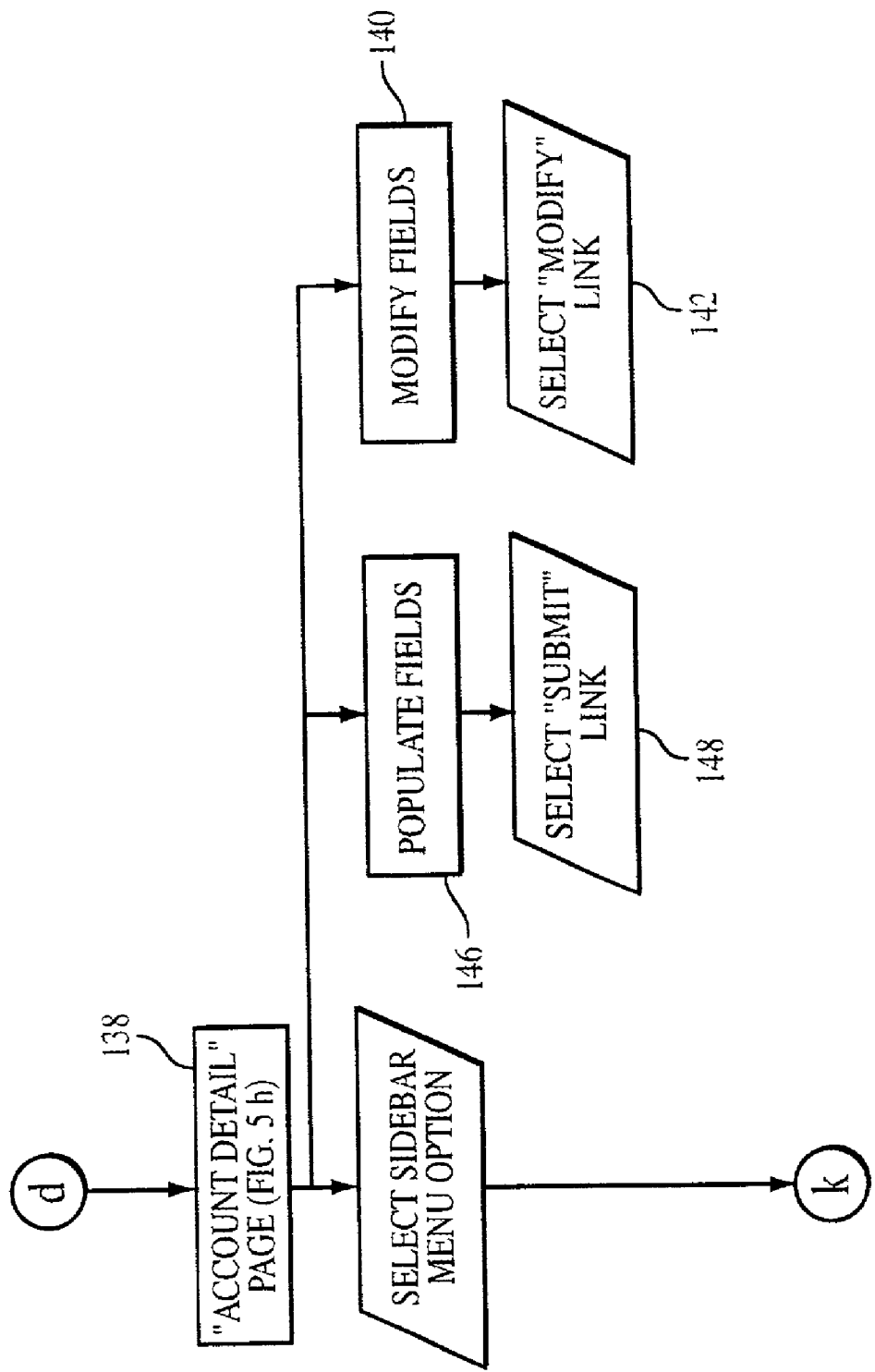
Figure 4C:
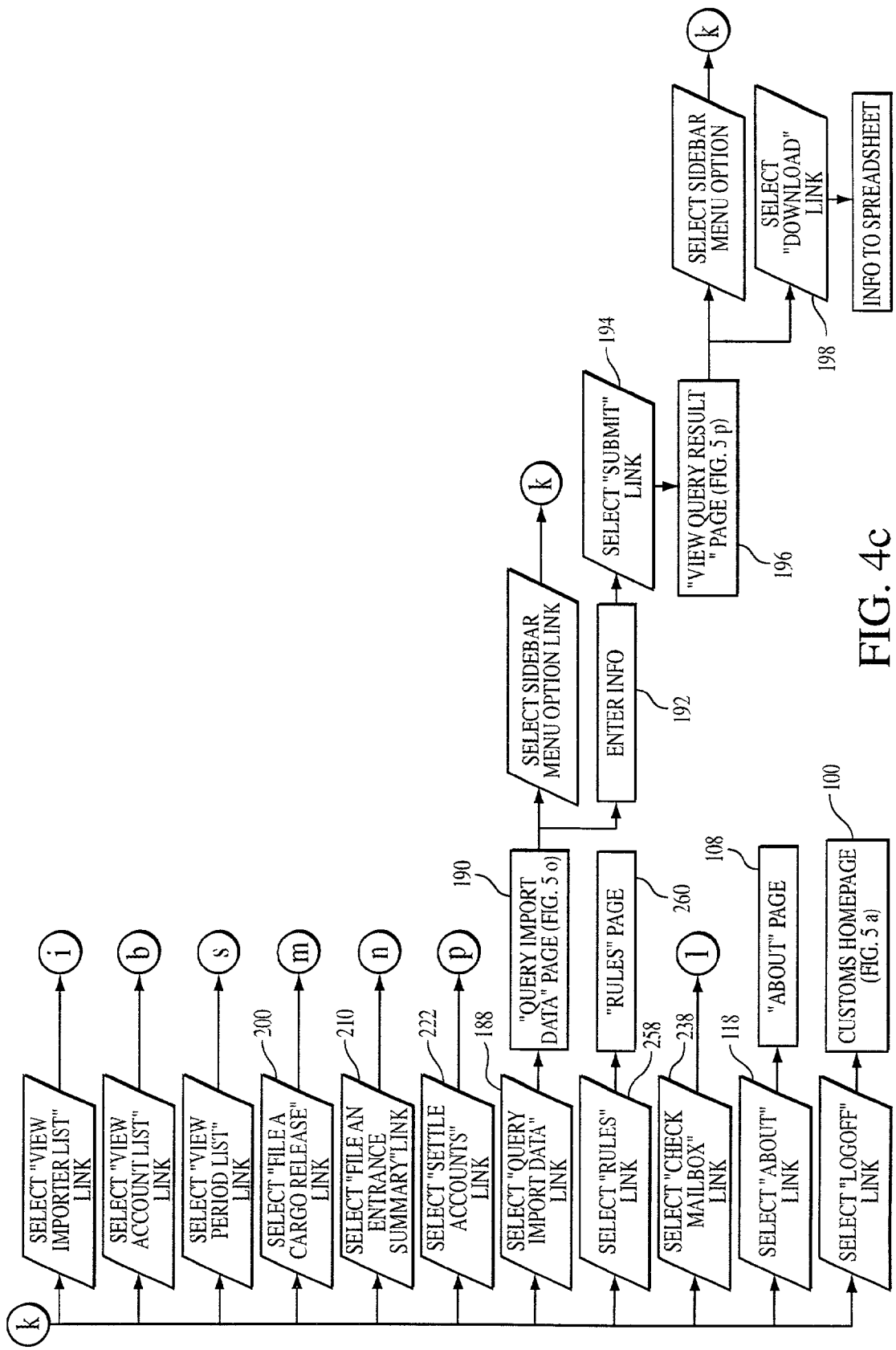
Figure 4D:
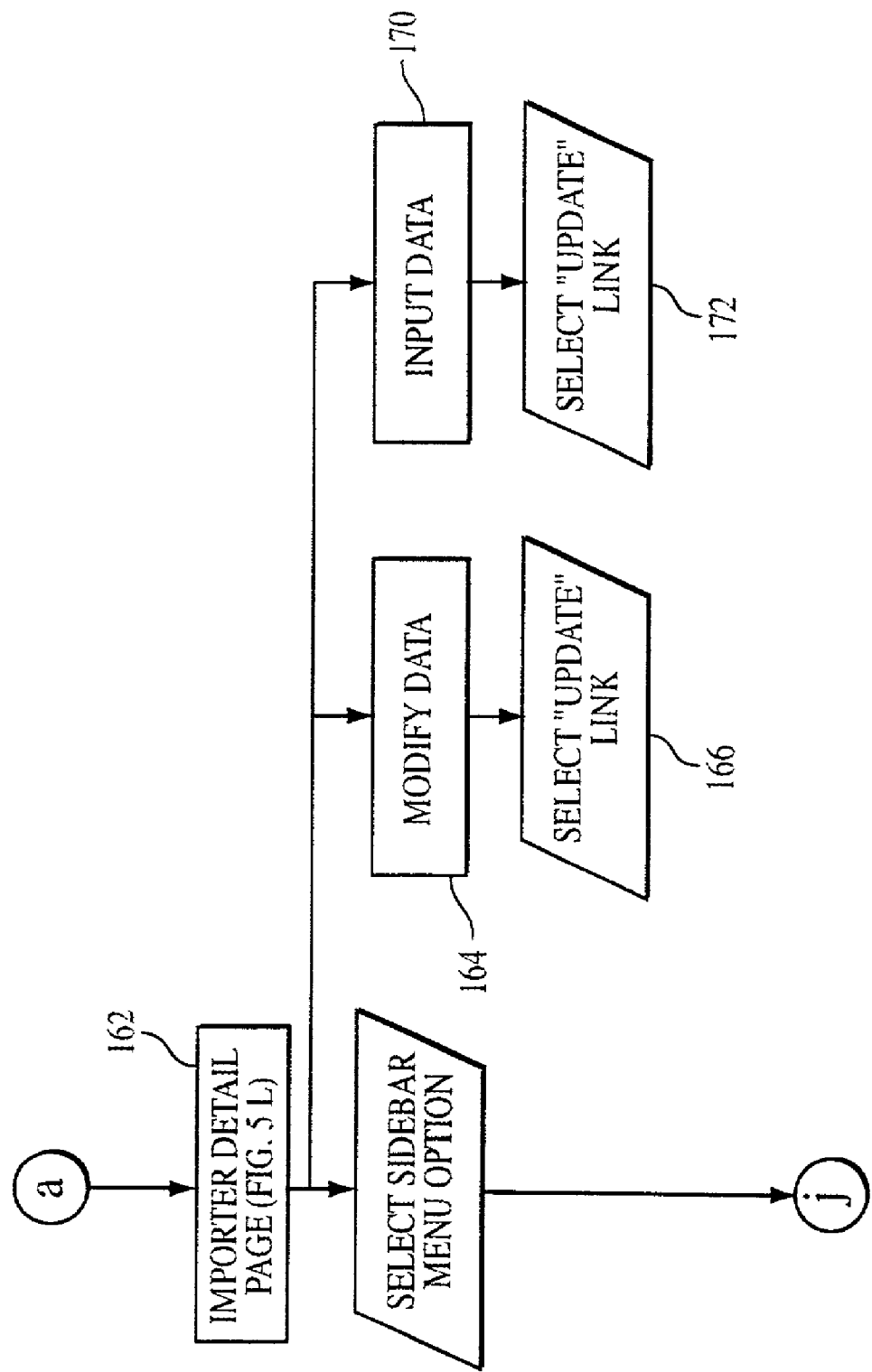
Figure 4E:
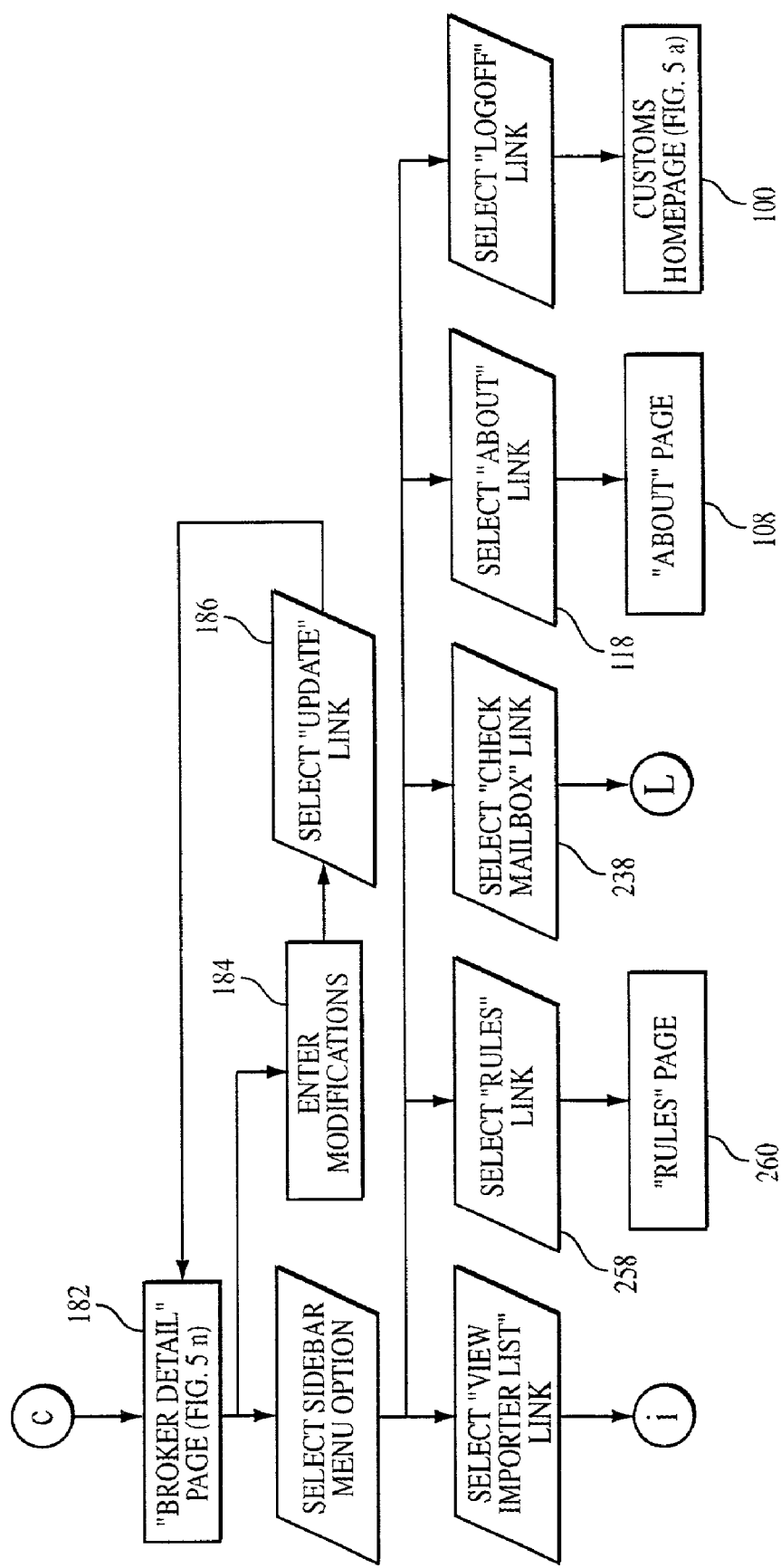
Figure 4F:
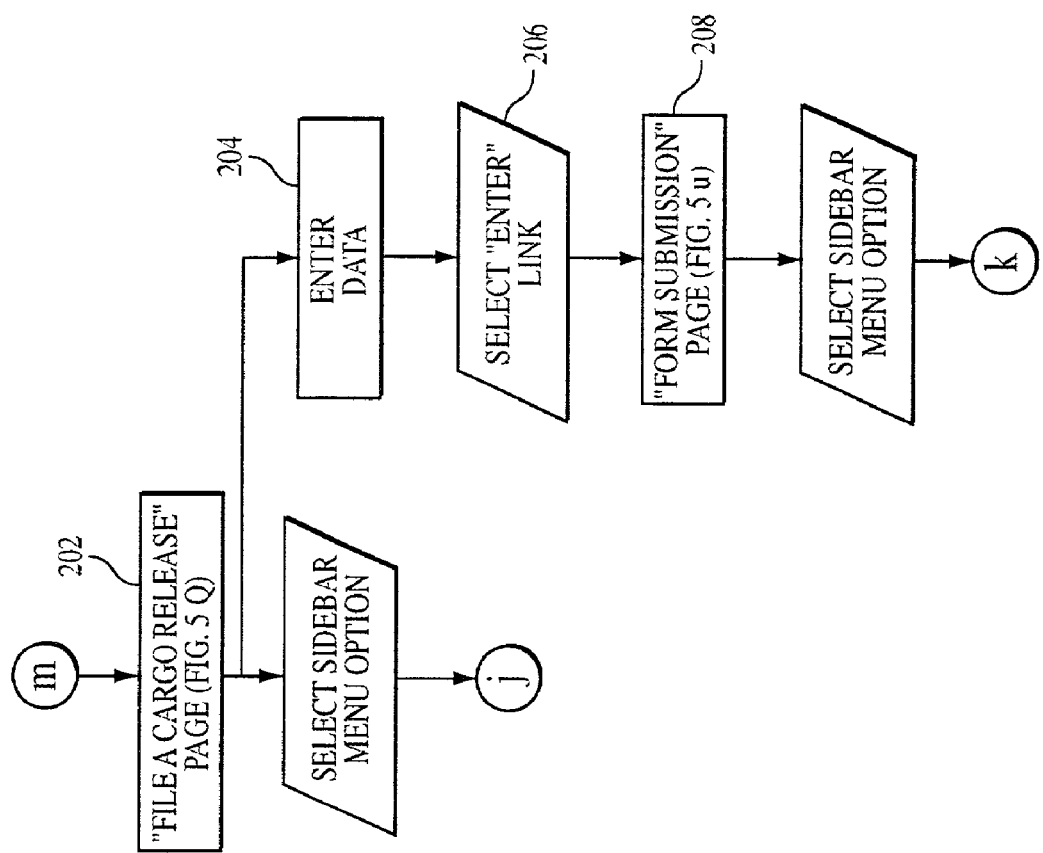
Figure 4G:
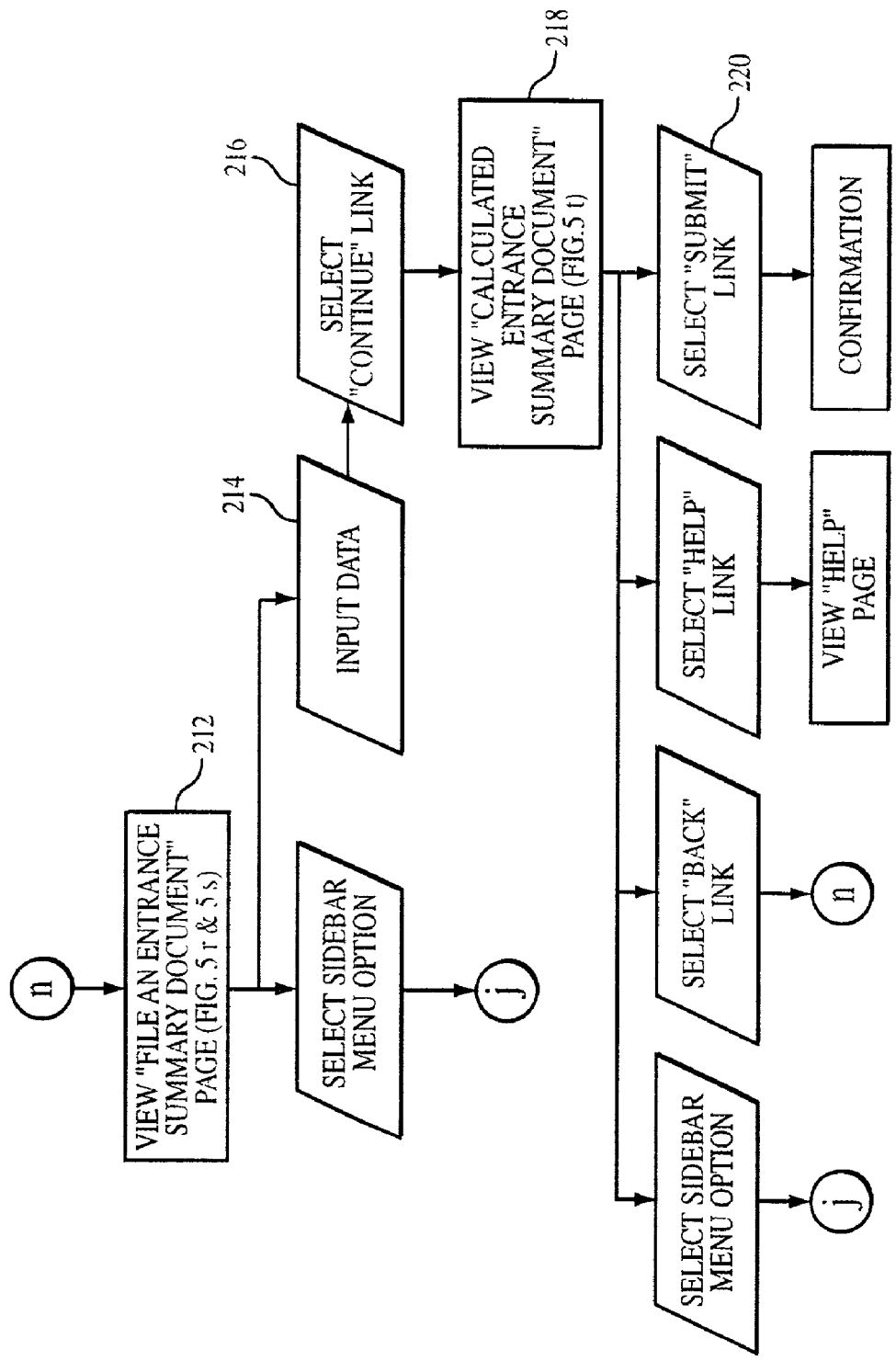
Figure 4H:
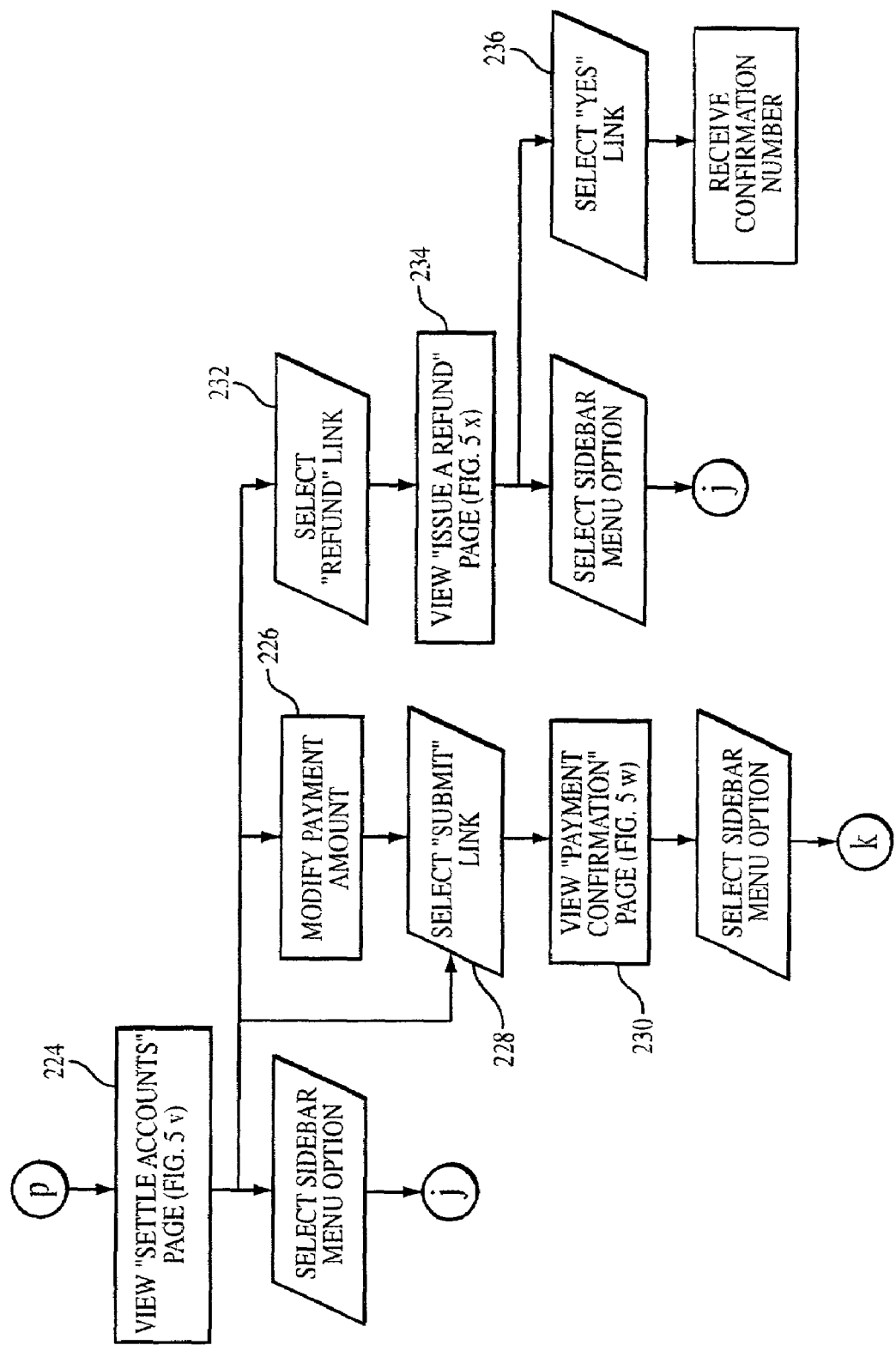
Figure 4I:
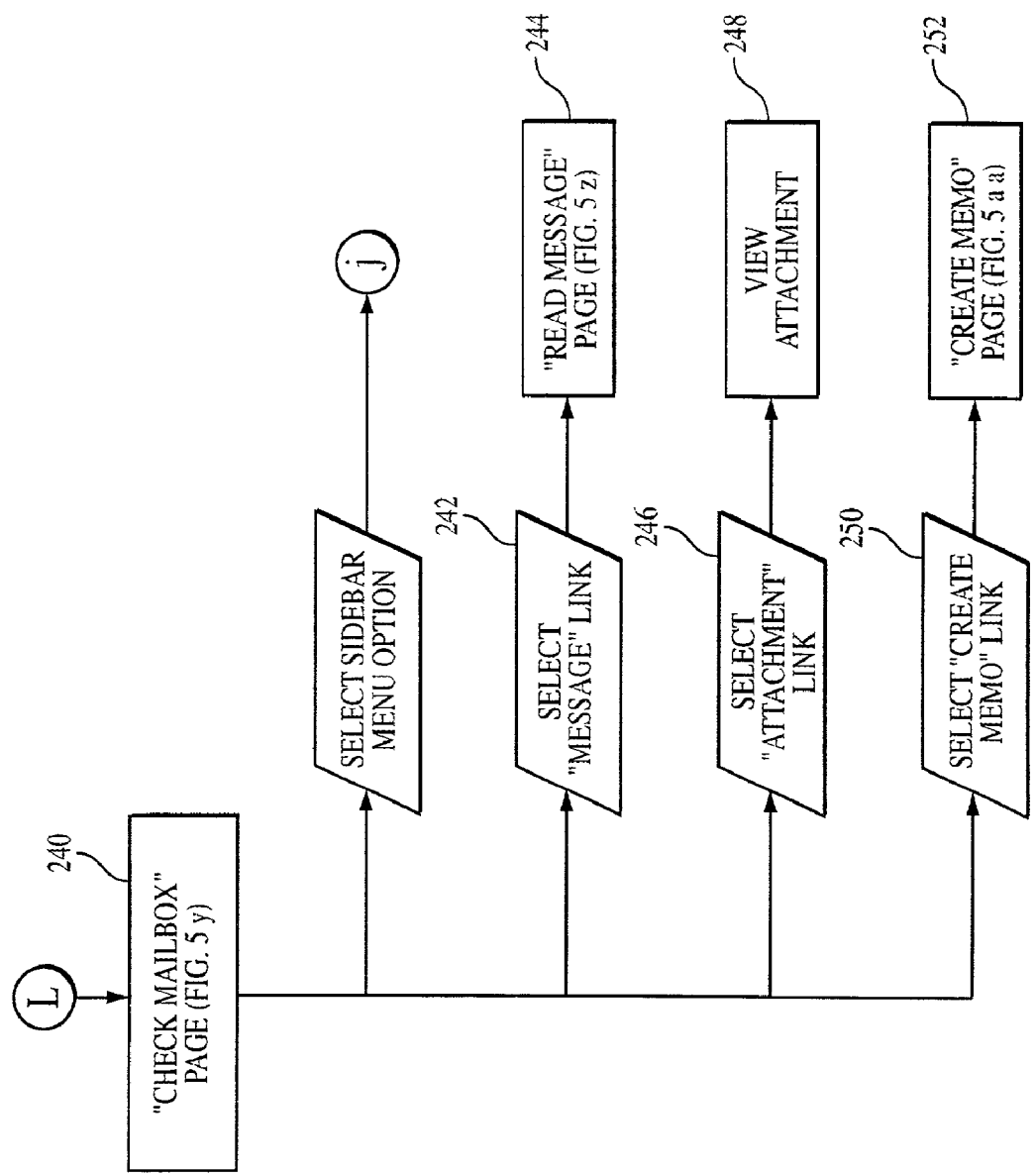
Figure 4J:
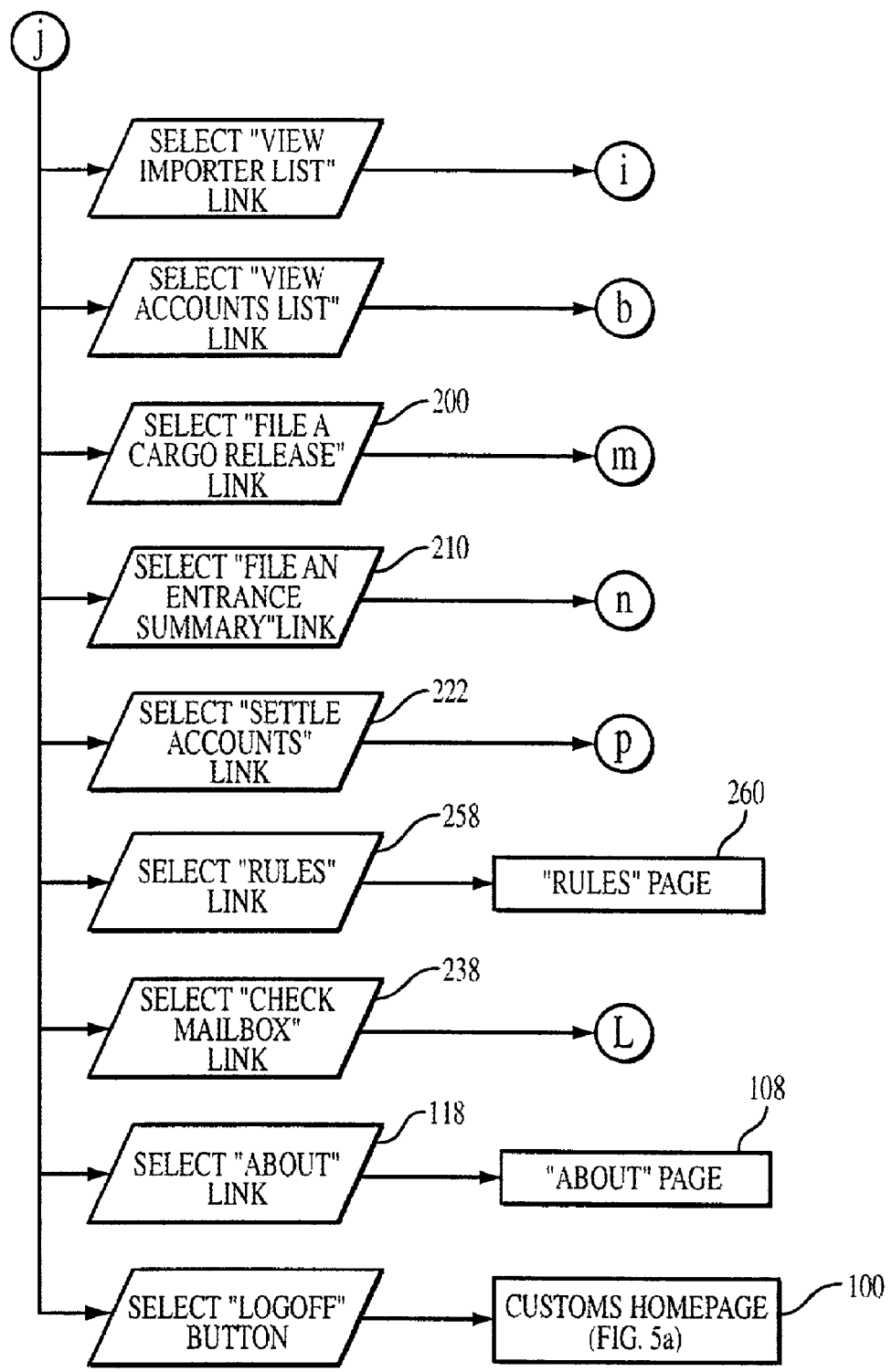
Figure 5A:
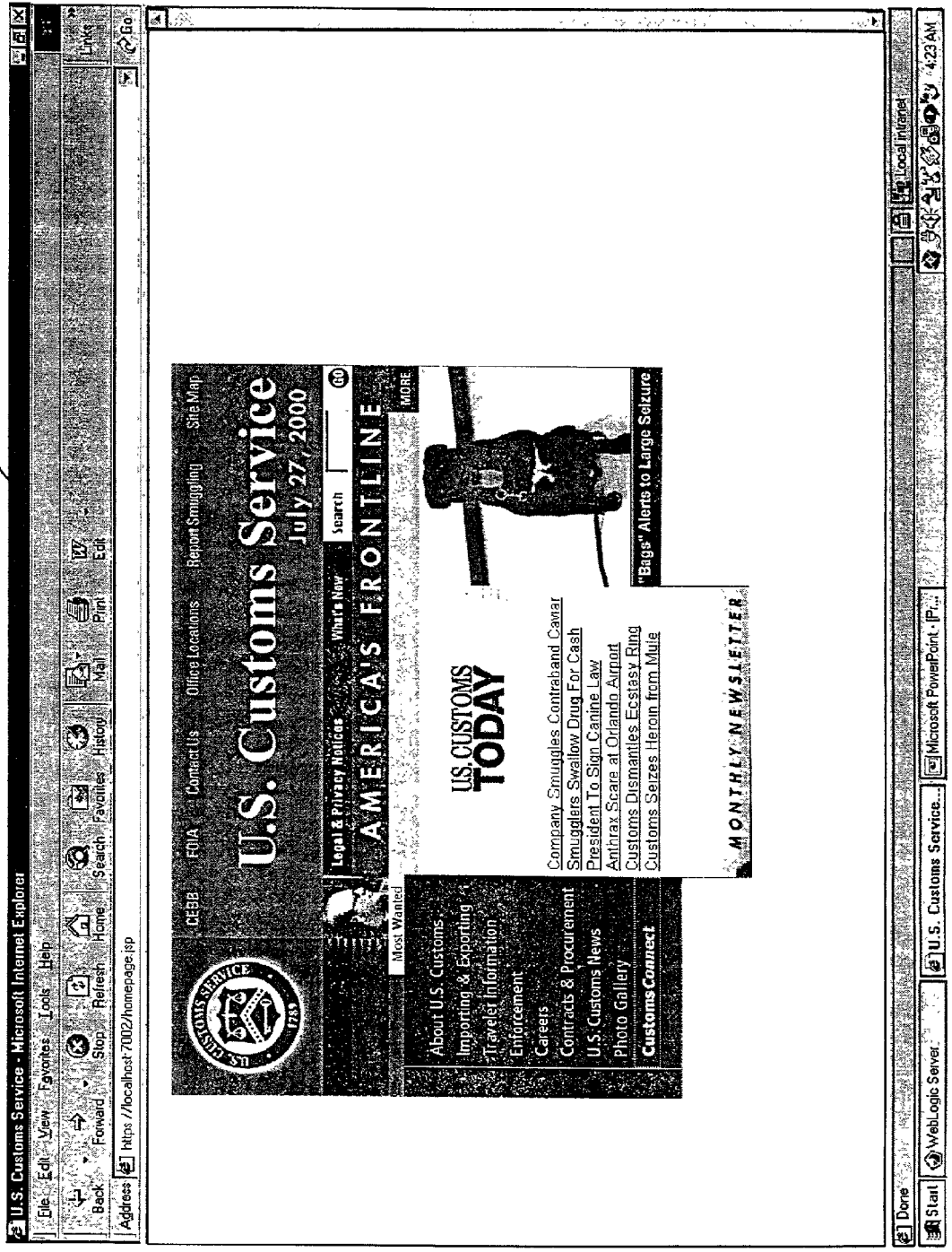
FIGS. 5a-5aa are screen shots.

As shown in cross-referenced FIGS. 4*a*-4*j* and 5*a*-5*aa*, a user might access the system by selecting 102 a link on the U.S. Customs Service homepage (http://www.customs.ustreas.gov) 100. FIG. 5*a* illustrates an exemplary screen shot that shows the U.S. Customs Service homepage 100. FIG. 5*a* shows the U.S. Customs Service homepage 100 with a new system link titled "custom's connect" on the bottom on the menu on the left side of the screen.

Figure 5B:
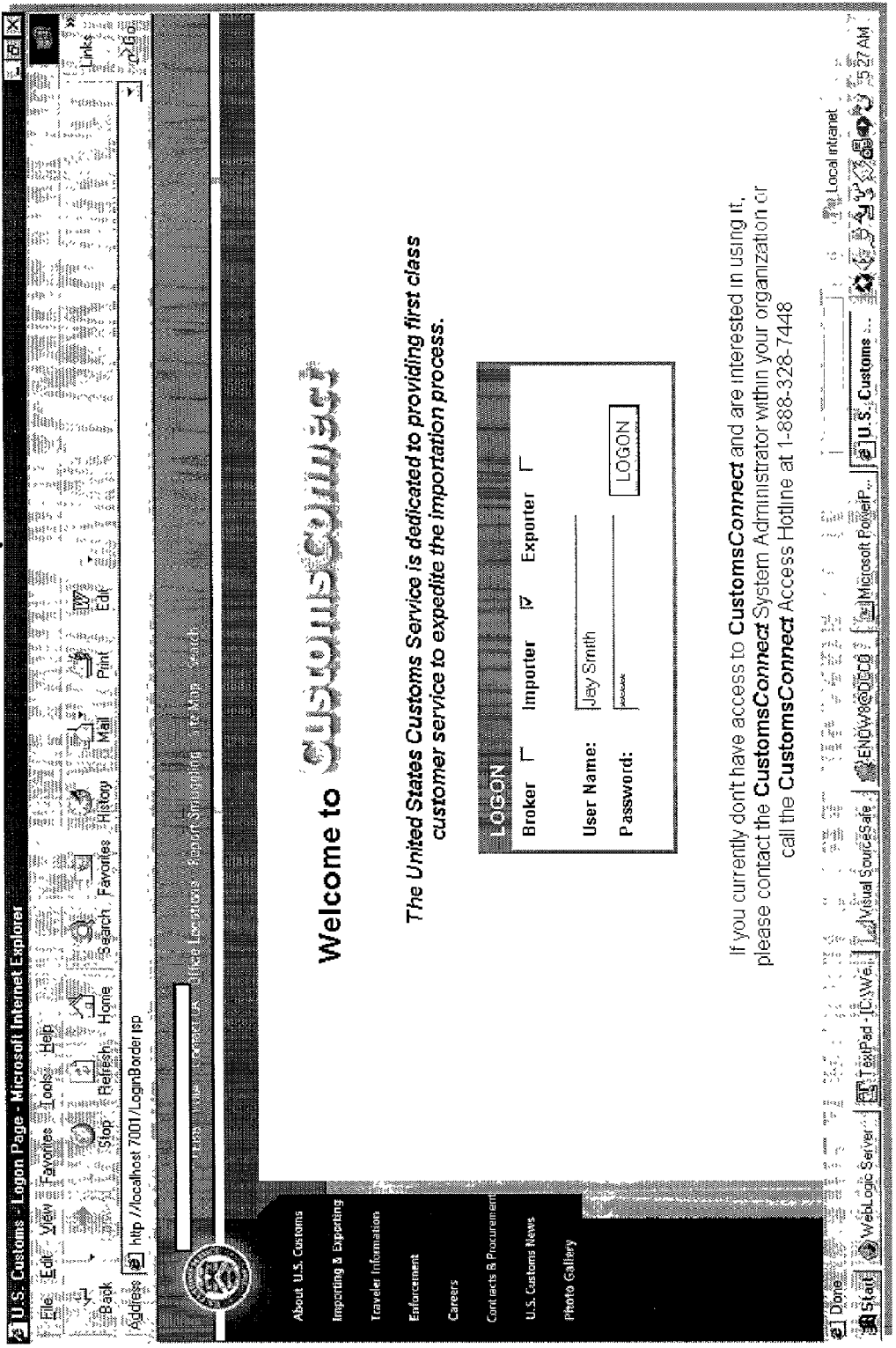

After the user selects 102 the system link on the U.S. Customs Service homepage 100, a "Logon" page 104 is displayed. FIG. 5*b* shows a "Logon" page 104. The "Logon" page 104 may include a greeting to the user, and prompt the user to enter a user type (e.g. broker, importer, exporter), a user name and a password. Other methods of authenticating a user's identity (e.g. by using a smartcard) may be implemented.

Figure 5C:
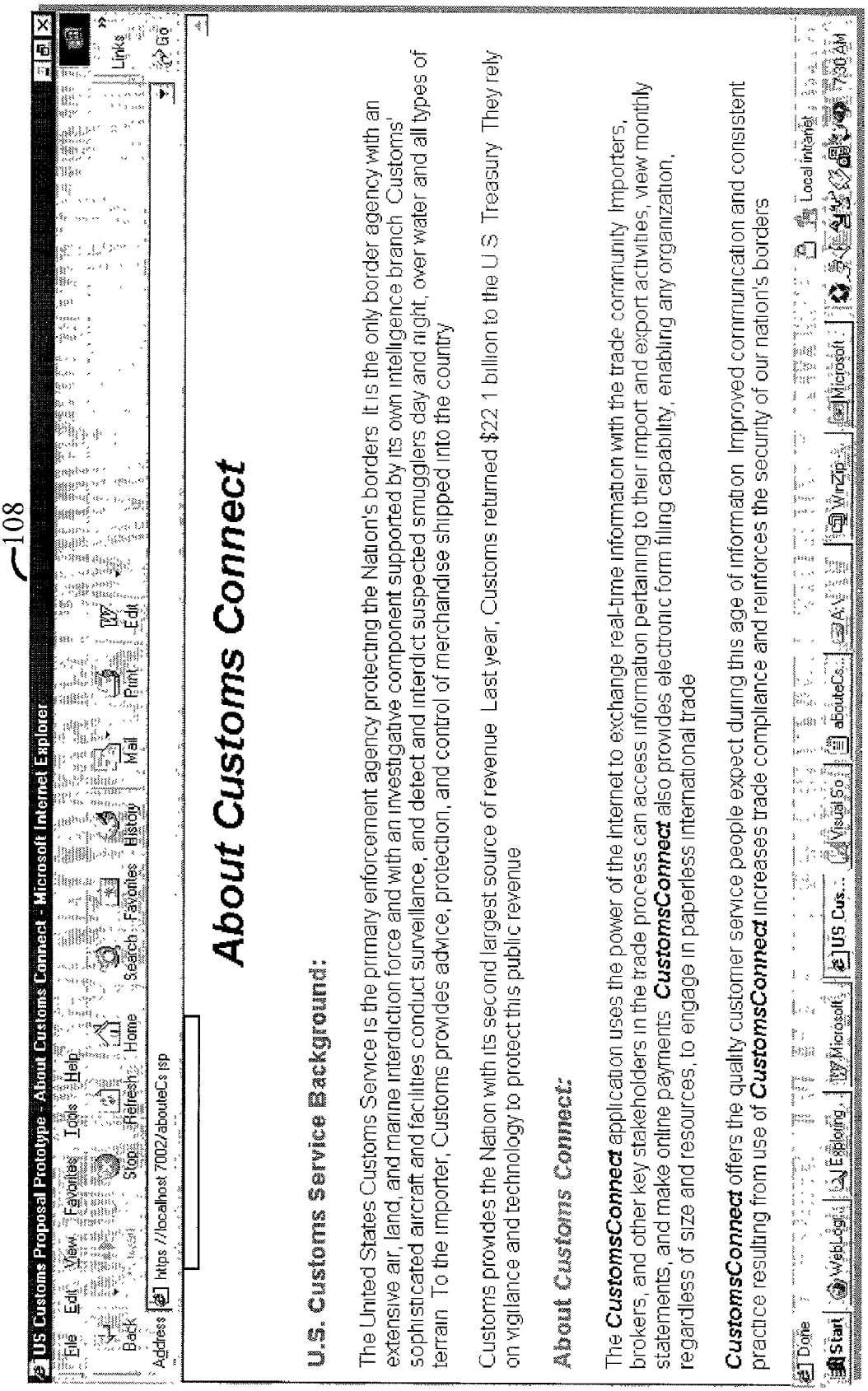

The "Logon" Page 104, includes an "About US Customs" link. If the user selects 106 the "About US Customs" link, the "About Customs Connect" page 108 is displayed, as shown in FIG. 5c, which includes facts about U.S. Customs, the website and its usage. The "About Customs Connect" page 108 may provide access to search functions, indexes, and any other typical informational tools generally found in an informational, page. Links to other informational pages may also be included on this and/or other pages in the system.

Figure 5D:
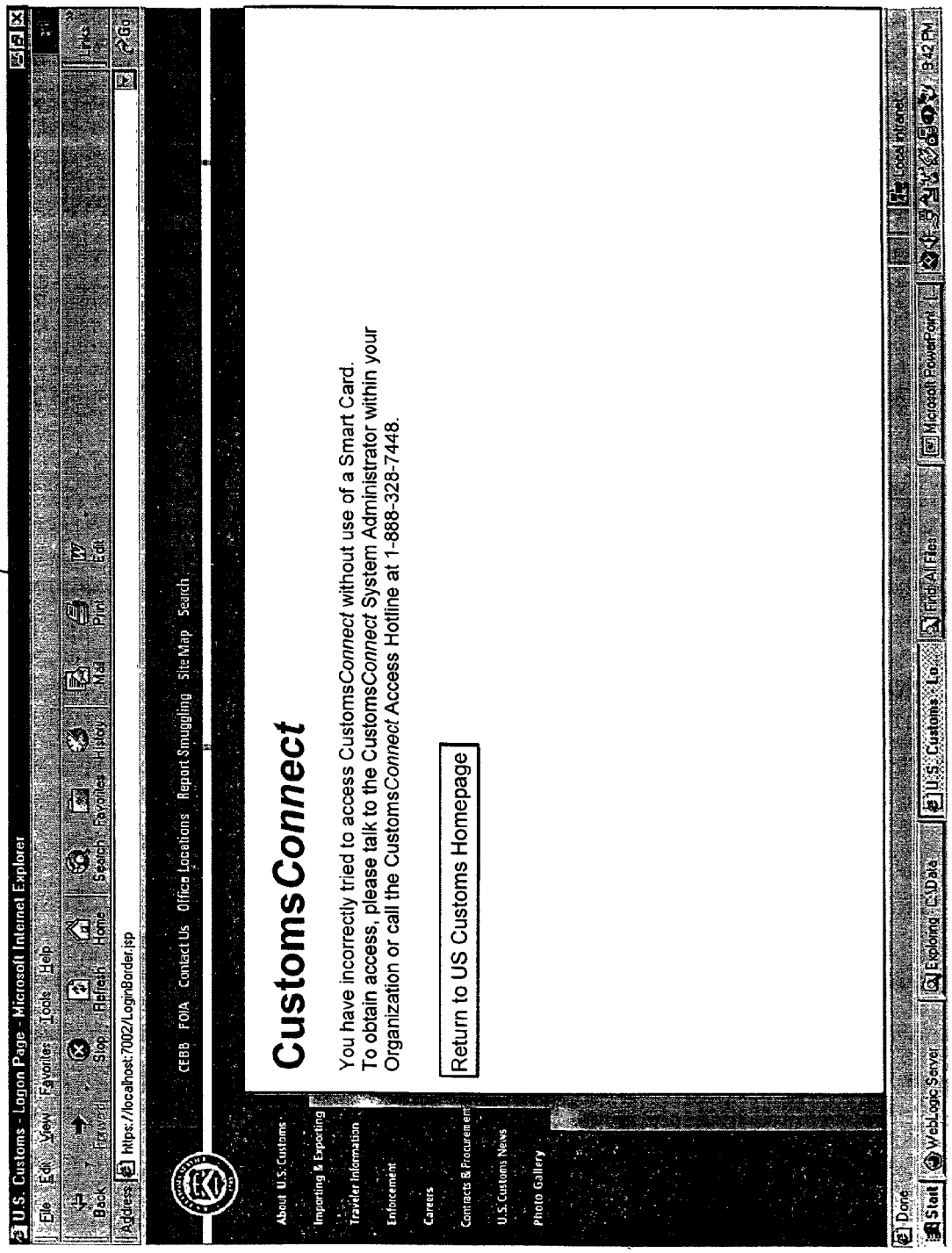

Referring again to the "Logon" page 104 of FIG. 5b, if the user enters 110 a password and selects 112 the "Logon" link, the system determines 114 whether the logon is successful. The system makes this determination by considering the user information entered. If the logon is not successful the system displays a "Non-Registered Users" page 116, shown in FIG. 5d. This page instructs to the user to contact the organization's systems administrator in order to gain access.

If the system determines that the logon was successful, it will then determine (122, 132, 174 & 254) what type of user has logged on. The type and amount of information available to a particular user may be customized and may be determined based on the password entered while logging on to the system.

If the system determines 122 that a user is a systems administrator 24, the system will display a "New User Registration" page 124, as shown in FIG. 5e. A "New User Registration" page 124 initially includes several empty data fields. The systems administrator 24 enters 126 new user data in these fields to request access to the system for a new user. A "New User Registration" page 124 requests a user's name, address, title, phone number, email address, functional roles performed by the user, and any other pertinent user information. Functional roles performed by a user may include, for example, add, modify, delete, filing, payments, and refunds.

The systems administrator 24 may also be required to enter pertinent contact information about the organization he represents. Typically, a systems administrator 24 is the only person in an organization allowed to access the "New User Registration" page 124. The systems administrator 24 can only add new users from the organization he belongs to. Adding new systems administrators 24 to an organization's database may be performed outside of the website.

Organizations register to use to system. This may be done in any convenient way, but is usually done outside of the system website. Registering an organization includes, setting up a database for that organization. All information related to that organization is entered into the database. Depending on the type of organization that is being registered, members of the organization may be assigned importer 18 access, customs broker 22 access, or any other predetermined level of access that may be desirable.

After a systems administrator 24 enters 126 new user data, he can select 128 "enter", which submits the new user's information to the system. Access to the system may not be immediately granted. Typically, the validity of the new user information and their association with the organization is checked prior to granting access. Access may be granted by mailing a smartcard to the new user, or by providing access to the system in some other convenient manner (e.g. passwords).

Figure 5F:
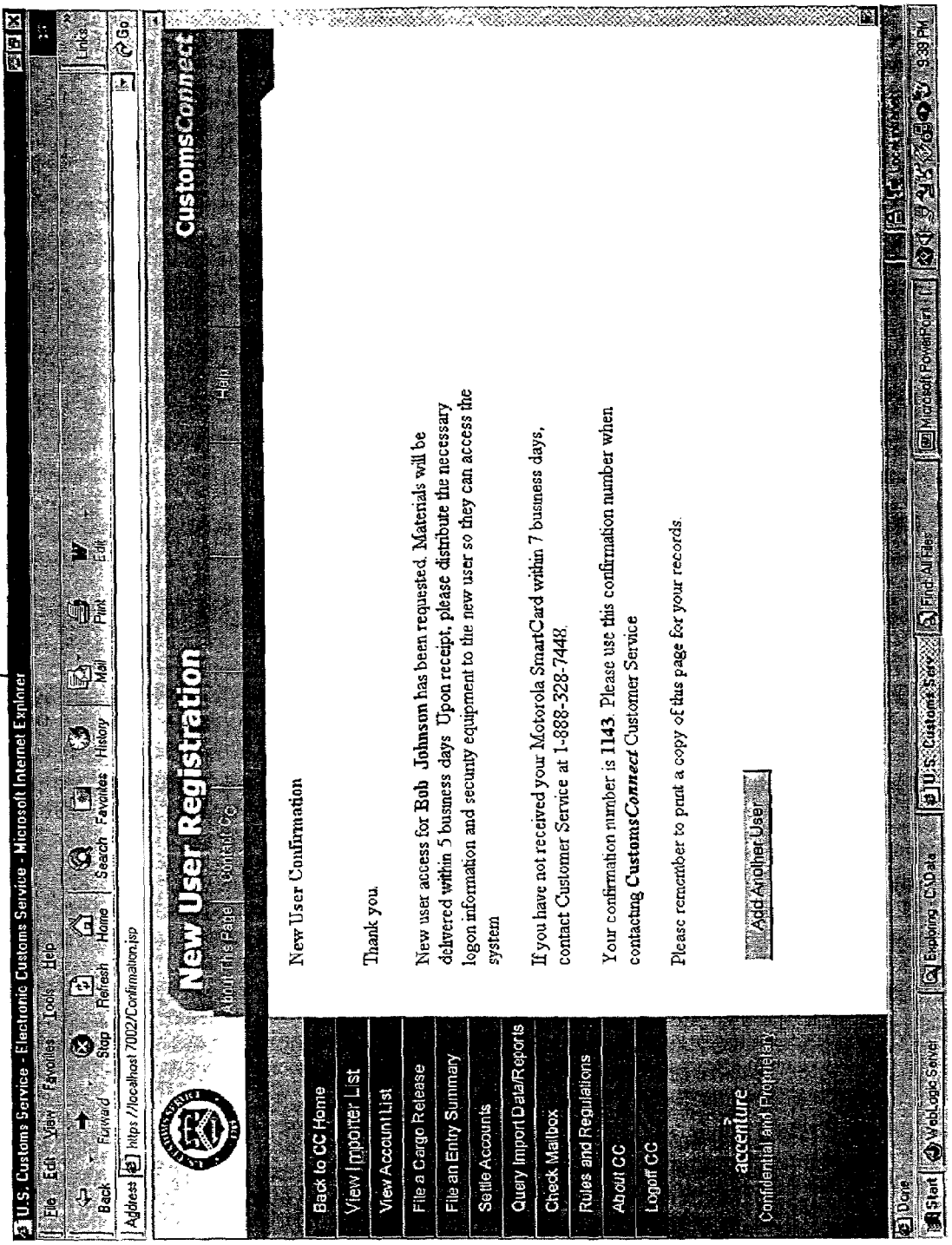

After a systems administrator 24 selects 128 "enter" the system displays a "New User Confirmation" page 130, as shown in FIG. 5f. This page displays a message confirming receipt of the new user's information. The message may include information regarding when the systems administrator 24 can expect that access will be provided to the new user and when any required system informational material will be sent to the new user. The systems administrator 24 may be asked whether he wants to add more new users.

Figure 5G:
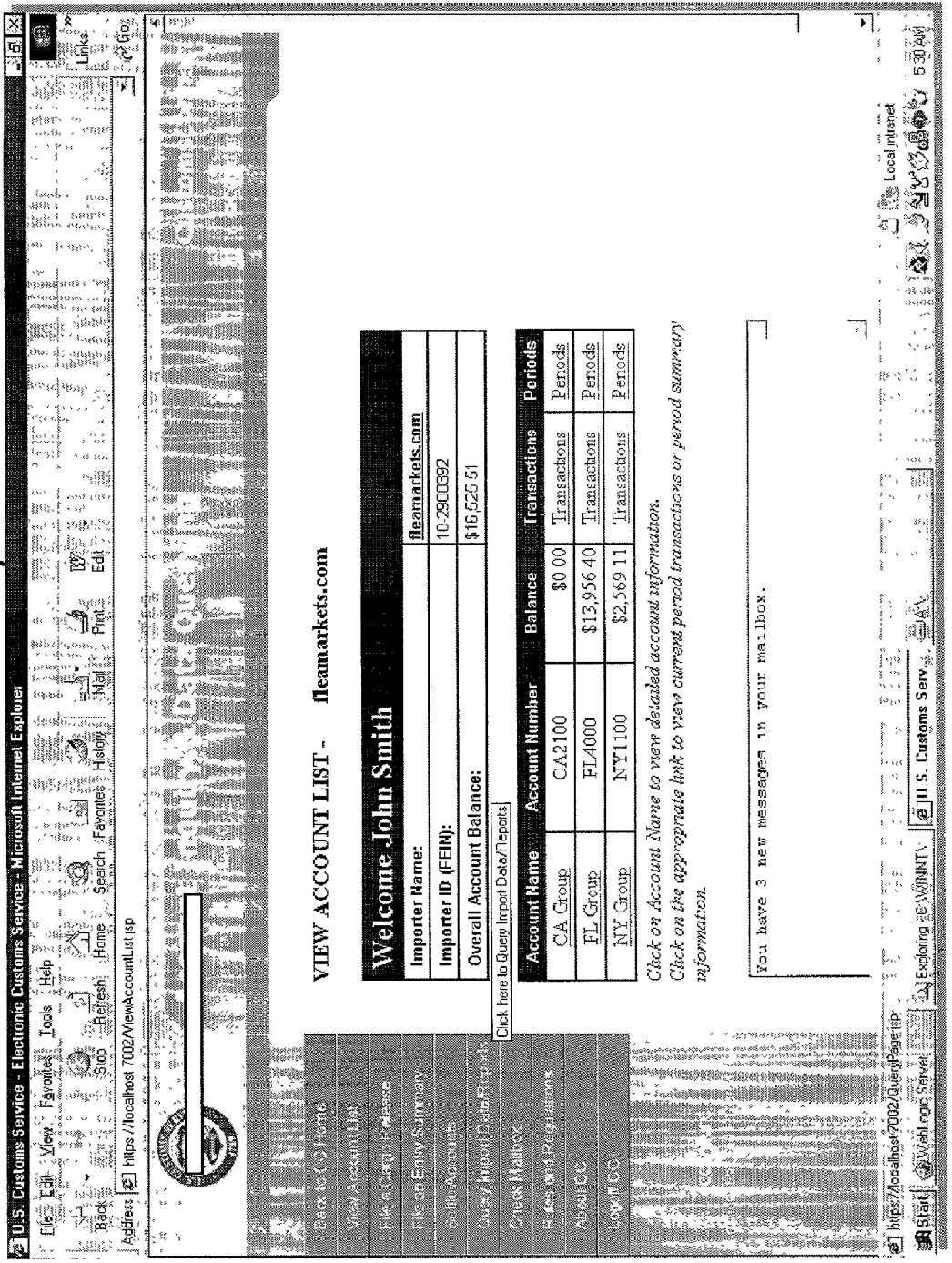

After logging on to the system, if the system determines 132 that a user is an importer 18, it displays a "View Account List" page 134, as shown in FIG. 5g. Although this page is the first page displayed to an importer 18 after successfully logging on, the page may also be accessed by a customs broker 22 interested in obtaining information regarding one of their importer 18 clients.

The heading of the "View Account List" page 134 includes the name of the importing organization, the importer's Federal Employee Identification Number (FEIN), and the overall balance the importer 18 owes for the accounts listed. The table on this page includes a listing of account names, numbers, and balances for each account registered by the importer 18. If the page is being accessed by a customs broker 22, the table will only include importer accounts which the customs broker 22 is allowed to access.

Account names are assigned by an importer 18. For example, an importer 18 may process imports separately at several different locations and may assign account names according to location (e.g. Southwest Chemicals Division, European Poultry, etc.).

The account number is a tracking number that is assigned by the importer 18 when the account is created. The U.S. Customs Service 26 may assign other account numbers to a particular account.

The balance column indicates the financial balance that results from all financial activity pertaining to an account. A positive balance indicates that an outstanding balance is due to the U.S. Customs Service 26, and a negative balance indicates that an overpayment has been made to the U.S. Customs Service 26.

The accounts in the table are arranged in ascending order by account number, but may be rearranged in any convenient order. The total number of simultaneously viewable rows of account information may be customized. The page also includes a field to enter or review reminders (e.g. entry summary filing dates, past due payments, etc.)

In the "View Account List" page 134 of FIG. 5g, each field in the column titled, "Account Name" is a link. A user may select 136 an "Account Name" link, causing the system to display an "Update Account Detail" page 138 (FIG. 5h) for the selected account. If a user accesses this page by selecting 136 an "Account Name Link" from the "View Accounts List" page 134, the data will be either viewable only (view mode) or modifiable (modify mode). In the view mode and the modify mode, all data fields will be initially populated. Typical data fields that appear on this page include: account name, account number, address, contact name, contact title, contact phone number, broker name(s), etc. In the modify mode, the user will be allowed to modify 140 information in certain fields. Once all modifications are made, the user may select 142 the "submit" link.

Figure 5H:
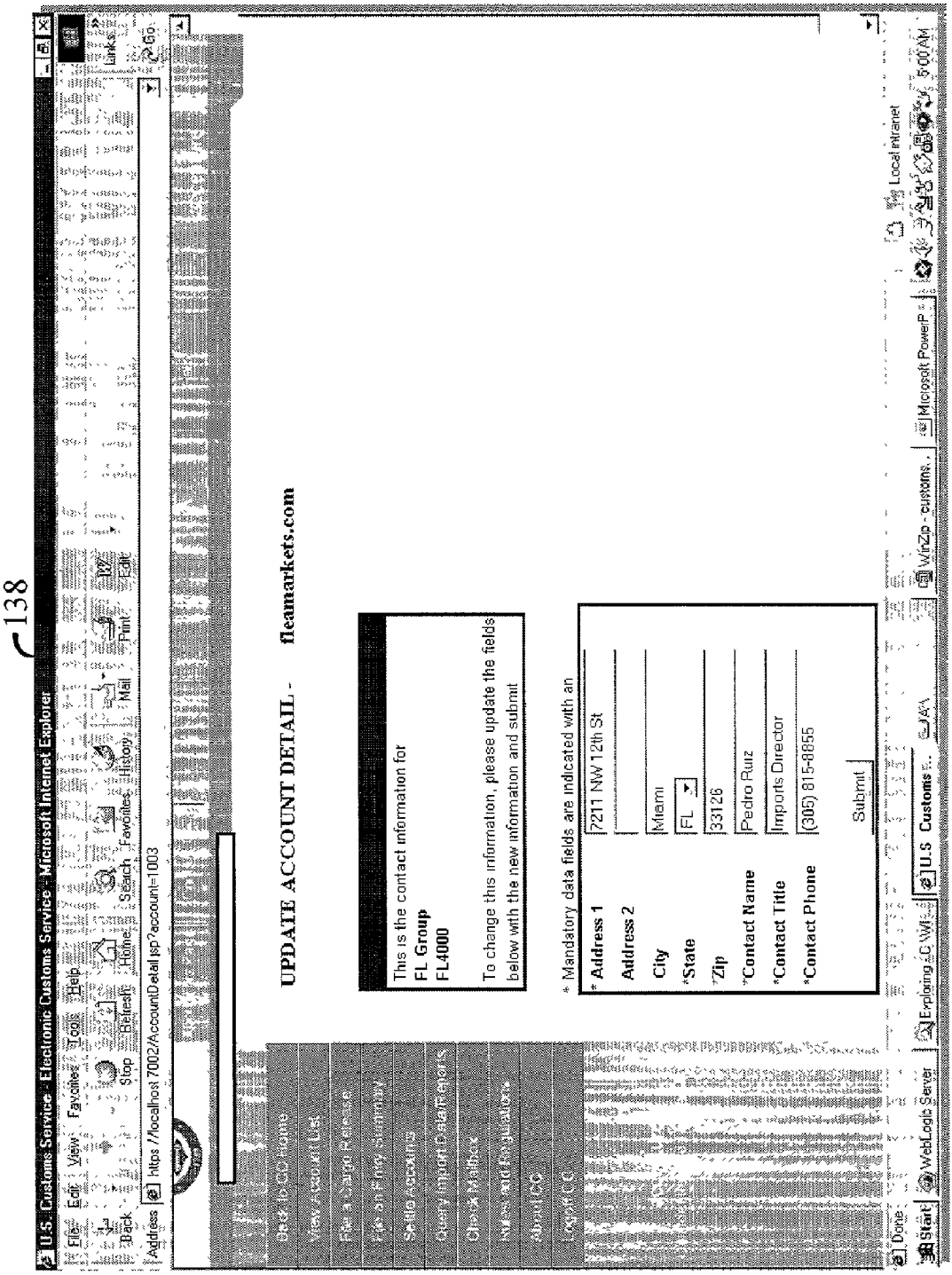

Another way to access the "Update Account Detail" page 138 of FIG. 5h is by selecting 144 an "Add New Account" link that might be included on the "View Account List" page 134. If the "Update Account Detail" page 138 is accessed in this manner, the data fields on the page will be in add mode. When the page is accessed in the add mode, all data fields on the page will initially be blank. The user will be prompted to populate 146 the data fields and select 148 the "submit" link. Both importers 18 and customs brokers 22 may be assigned capabilities to add new accounts. If a customs broker 22 adds a new account, there will generally be some formal validation method implemented to ensure that an importer 18 has agreed to allow the customs broker 22 to add this account.

Measures might be implemented to prevent the inadvertent addition of duplicate new accounts. For example, if an importer 18 has access to the system, then only the importer 18 might be allowed to add new accounts, and if the importer 18 does not have access to the system, then only the customs broker 22 might be allowed to add new accounts. Other convenient methods of preventing the entering of duplicate accounts may be utilized. When adding a new account, the account number and the account name are the minimum requirements to establish a new account. Typically, a new account cannot be added to the system until these fields are filled in.

Referring again to the "View Account List" page 134 of FIG. 5g, a user may select 93 a "transactions" link for a particular account. Selection of such a link causes the system to display a page providing details of particular transactions in an account.

Figure 5I:
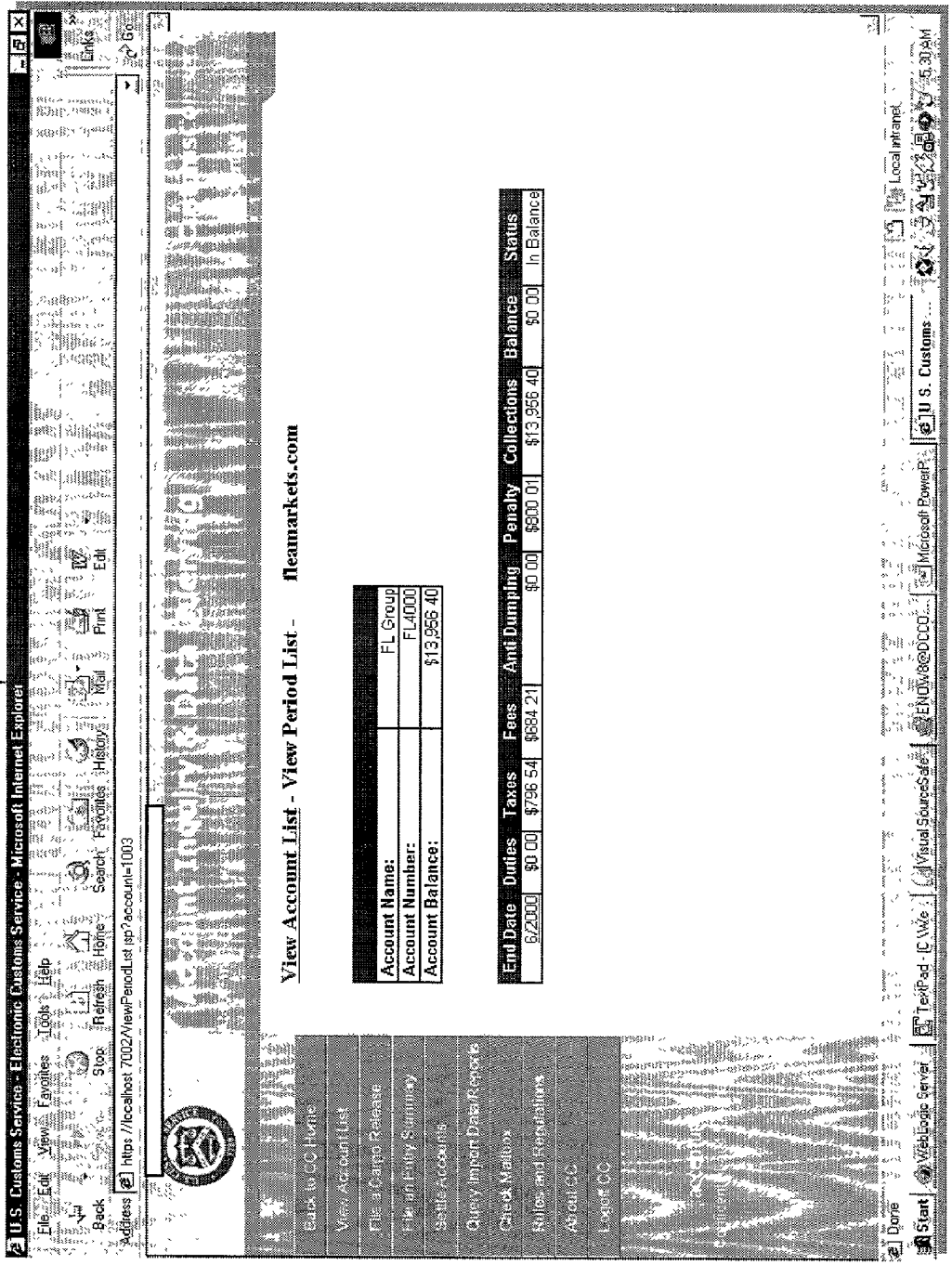

A user may select 150 a "periods" link, causing the system to display a "View Period List" page 152 for an account. A "View Period List" page 152 is shown in FIG. 5i. The "View Period List" page 152 displays periodic (e.g. monthly, weekly, quarterly, etc.) account information for a specific account.

The account name appears at the top of the "View Period List" page 152 along with the account number and the overall balance for the account. A table is included on the page that includes the account period end dates and financial summary information for the account including duties, taxes, fees, anti-dumping, penalty, interest, collections, and balance for each period. The table may also include a column titled "entered value" indicating the declared value of the merchandise being imported. The "Duties" column includes the total amount of duties on goods entered during that account period. The "Taxes" column includes the total amount of taxes associated with that account period. The "Fees" column includes the total amount of fees charged on the goods entered during that account period.

The "Anti-Dumping" column includes the total amount of anti-dumping and countervailing duty paid on goods entered during the account period. Anti-dumping and countervailing are measures taken to prevent unfair export practices of other countries. Dumping is the selling of goods in another country below the market price in order to gain a market share. The U.S. Customs Service 26 assesses additional duties when it sees an occurrence of dumping. Countervailing duties are imposed when a foreign nation subsidizes the production of a product imported into the U.S.

The "Penalty" column includes the total amount of penalty fees assessed on entries during that account period. These can be penalties due to late payments or violations.

The "Interest" column includes the total amount of interest charged for outstanding liabilities during that account period. The "Collections" column displays the total amount received for the account during that period, either through payments or by offsetting overpaid balances from an earlier account period. The "Balance" column indicates the net resulting amount after factoring in total liabilities and total collections for that account period.

The status of each monthly period is also displayed in the table of the "View Period List" page 152 of FIG. 5i. The status of the account can be, for example, open, in-balance, liquidated or protest. An "open" status indicates that there is still an outstanding balance. An "in-balance" status indicates that a required periodic payment has been made, but the transactions in that period have not yet been liquidated. Liquidation may occur up to a year after a particular period ends. A "protest" status indicates that one or more entries in the account period are questionable.

The "View Period List" page 152 of FIG. 5i can list up to twelve rows of data simultaneously. If, for example, monthly account summaries are listed on the "View Period List" page 152, the page will provide the most recent year's worth of periods for that account. The number of rows of information that can be displayed simultaneously can be changed.

Links to other periods of information may be listed on the page as well. Also, standard "next year" and "previous year" link functions may be available to facilitate scrolling through large amounts of information.

Figure 5J:
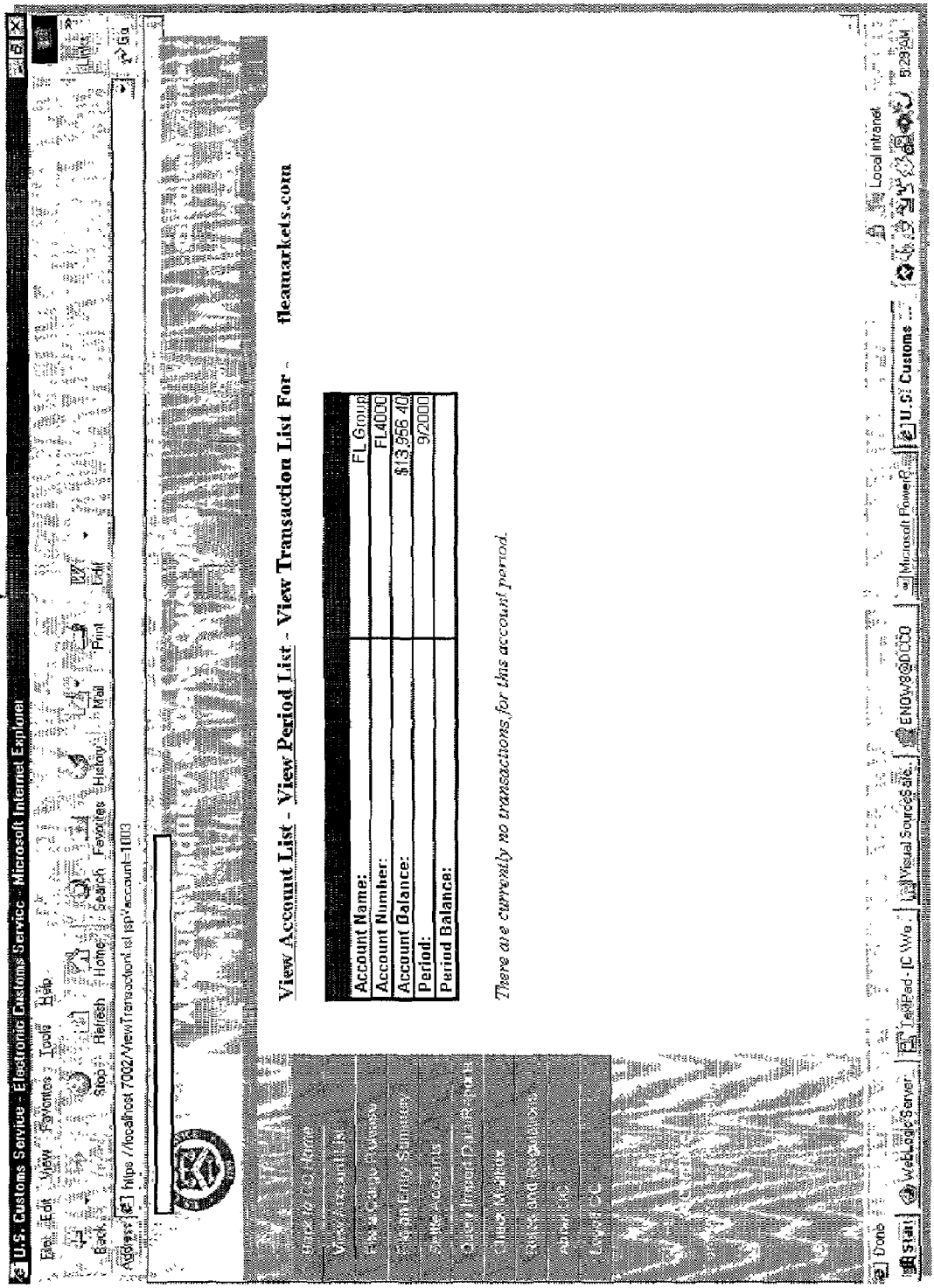

Each field in the "End Date" column of the table in the "View Period List" page 152 of FIG. 5i is a link. A user may select 154 an "End Date" link. Selection of an "End Date" link causes the system to display a "View Transaction List" page 156, as shown in FIGS. 5j, k. This page displays information pertaining to a specific account period.

At the top of the "View Transaction List" page 156, the account name is displayed along with the account number, account balance, period balance, and period start and end dates. A table may also be included (FIG. 5k) that provides a list of transactions including the date a transaction occurred, a transaction ID number, the transaction type, the transaction status, and the financial effect (i.e. liability or collection) of each transaction. All of the fields in this table are typically for viewing purposes only.

Each date displayed in the "Date" column is typically the date that a transaction was recognized by the U.S. Customs Service 26. The "transaction ID number" column indicates a system's identification number associated with each transaction. For example, for entries, the transaction ID number could be the entry number and for payments and refunds it could be the confirmation number.

The "liability" column identifies the liability effect that a particular transaction had on the account. The "collection" column lists the effect on collections a particular transaction caused. The combined effects from both liabilities and collections results in the balance for the entire account.

The "transaction type" column in the table may include such entries as, for example, cargo release transactions, entry summary transactions, payments, refunds, credit forwards, or credit receipts.

A cargo release transaction corresponds to the filing of a cargo release document. A cargo release document might be filed during an initial attempt to release goods into the U.S. from a foreign country. The "status" of such a transaction may be, for example, released, error, general examination, intensive examination, other government agency (OGA) release required and OGA released.

An entry summary transaction corresponds to the filing of an entry summary form. Possible "statuses" pertaining to this type of transaction include, for example, filed, error, paid, liquidated and protest. There is a positive liability effect for an entry summary transaction.

A payment is a record of a payment made to Customs. The "status" column for this type of entry may include entries such as either active or cancelled. There is a positive collection effect for a payment transaction.

A refund transaction provides a record of the issuance of a refund by the U.S. Customs Service 26. Typical statuses for this type of transaction include, for example, requested, approved, sent or denied. There is a negative collection effect for a refund transaction.

A credit forward transaction signifies the movement of additional collections from one account to another. These transactions would typically only have active statuses. They can be created by a monthly batch application that allocates credits to balance out accounts. A credit forward transaction generates a negative collection effect.

A credit received transaction signifies the movement of additional collections into the current account from another period. These transactions may have statuses of, for example, active. They can also be created by a monthly batch application that allocates credits to balance out accounts. A credit received transaction generates a positive collection effect. Other transaction details may be displayed on this page as desired.

Figure 5K:
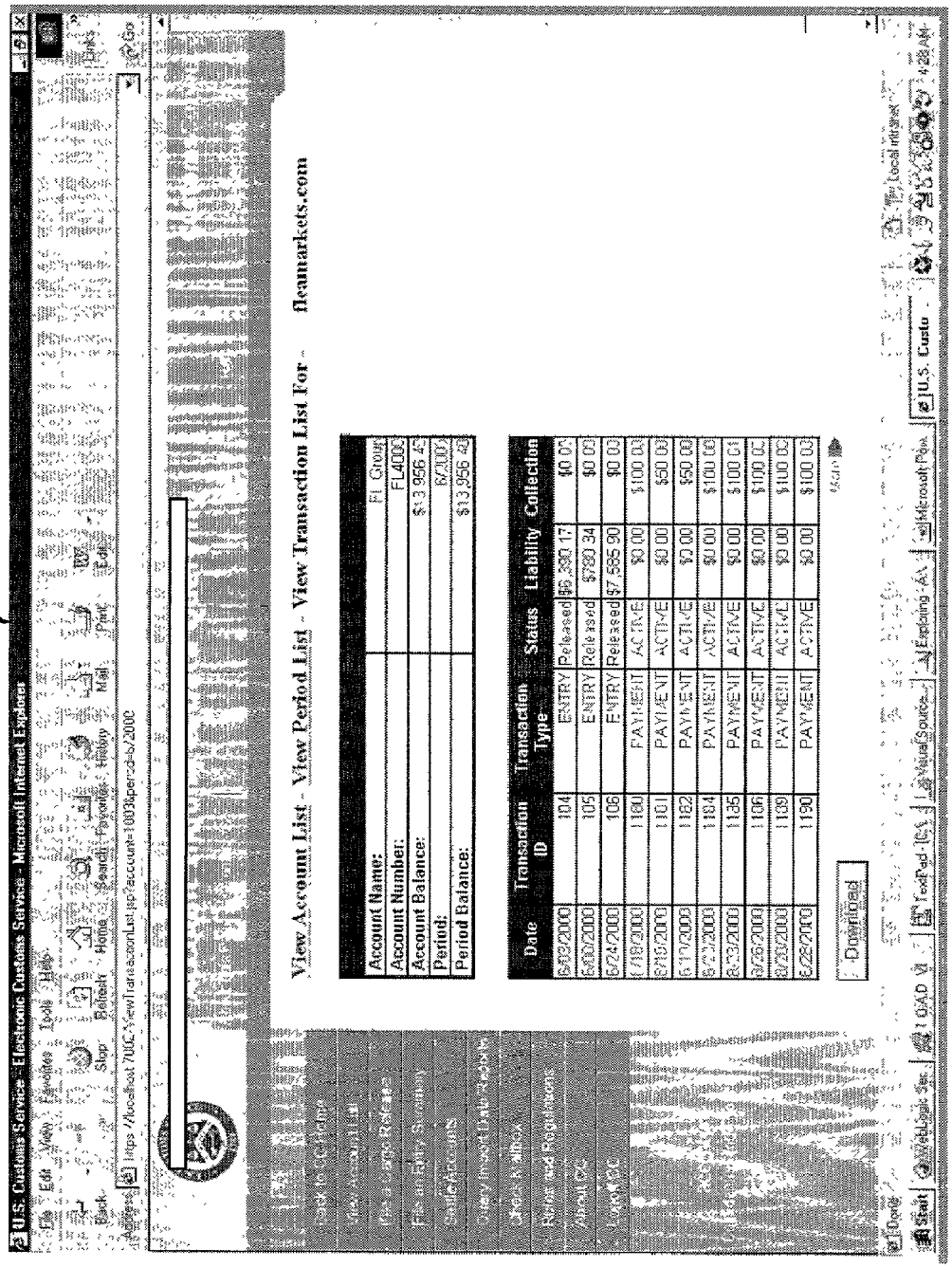
Figure 51:
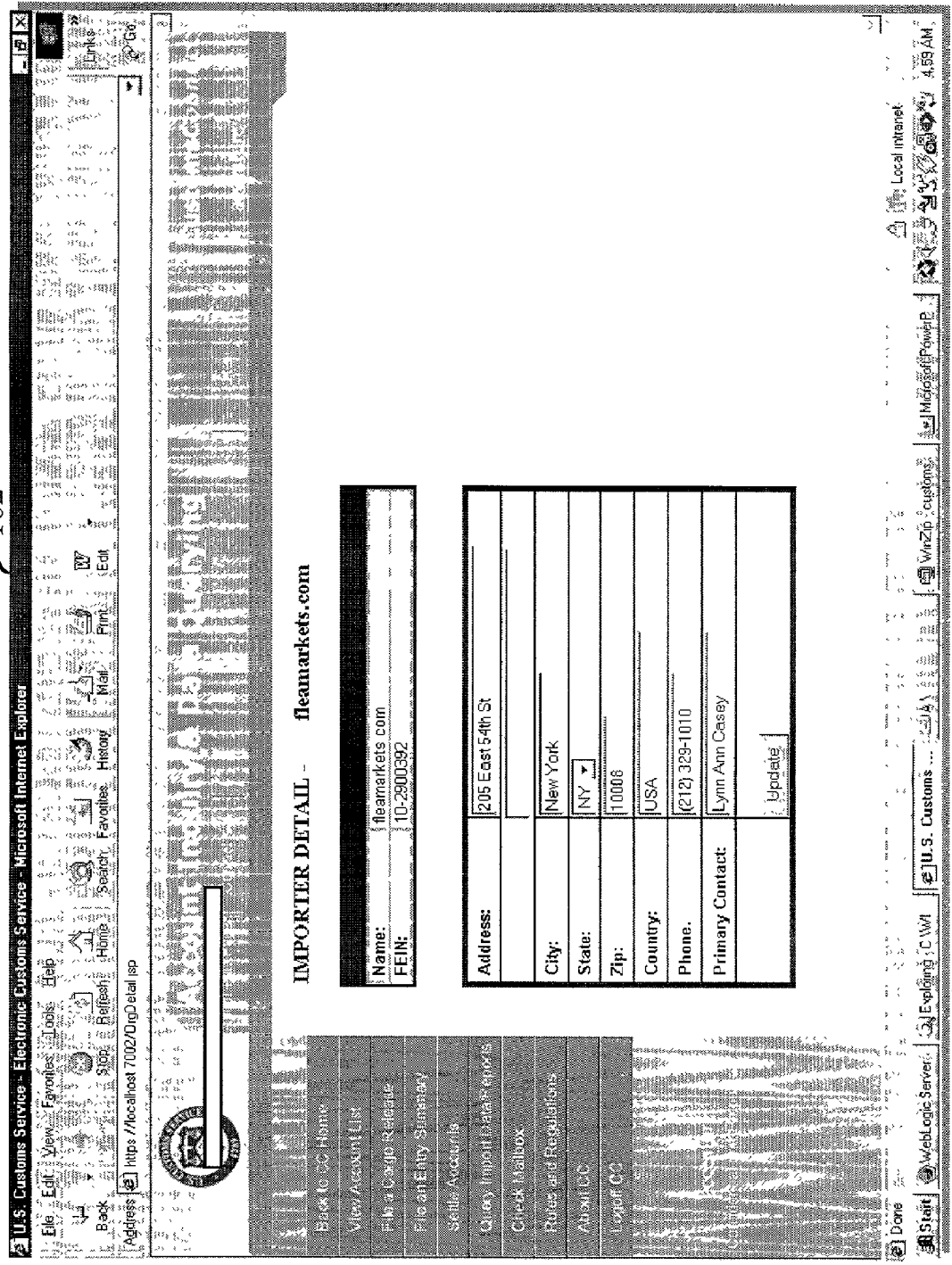

Certain fields in the table shown in FIG. 5k may be links to other pages, which might provide additional details for each transaction. The "View Transaction List" page 156 of FIGS. 5j, k also includes a sidebar menu. A user may select 158 an item from that sidebar menu. An exemplary flowchart detailing these sidebar menu options is illustrated in FIG. 4c. The options available in a sidebar menu may differ.

Referring again to the "View Account List" page 134 shown in FIG. 5g, the field labeled "Importer Name" is a link. A user may select 160 an "Importer Name" link. Selection of that link causes the system to display an "Importer Detail" page 162, as shown in FIG. 5l.

The "Importer Detail" page 162 provides contact information for a specific importing organization. When this page is accessed by selecting 160 an "Importer Name" link on the "View Account List" page 134, all of the fields will already be populated.

Certain users may be authorized to add to, modify, and/or delete the information on the "Importer Detail" page 162. Such authorization may be established during the user logon process. For users with such authorization, an "Update" link (shown in FIG. 5l) will be available. For those users, they may modify 164 the data, and then select 166 the "Update" link. This causes the system data to be modified.

Figure 5M:
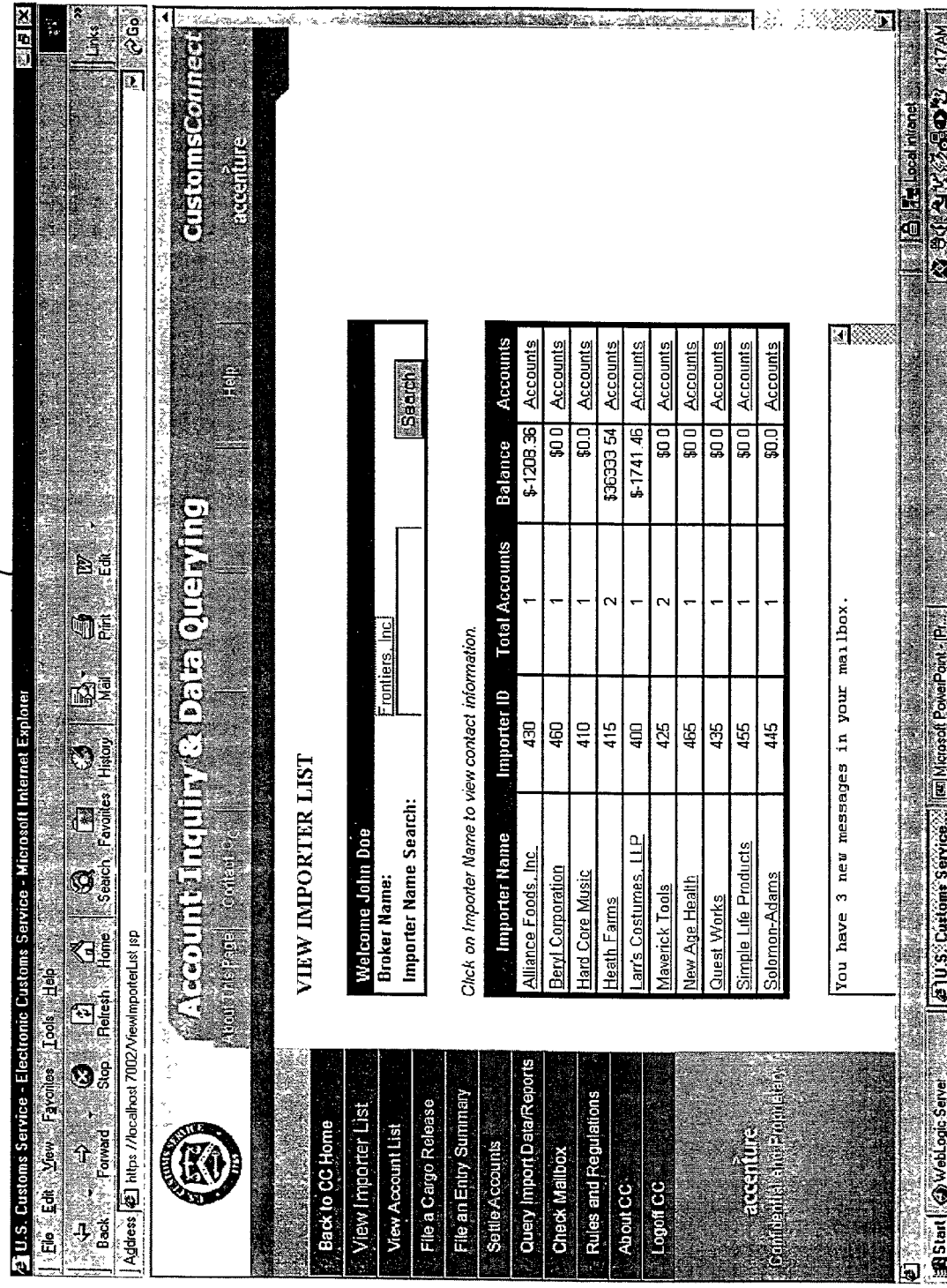

Alternately, a user may access the "Importer Detail" page 162 of FIG. 5l by selecting 168 an "Add Importer" link on a "View Importer List" page 176 (FIG. 5m). For users accessing the page in this manner, the page will be in add mode and will initially be blank. Typically, only customs brokers 22 access the page in this manner. Text will appear prompting the user to select an importer 18 from a list of importers 18. The importer 18 should already exist in a system database. Adding the importer 18 in this manner provides registration for access to the system.

Customs brokers 22 are typically not allowed to update or add information pertaining to importers 18 that already have access to the system. The customs broker 22 may input 170 data to the fields by selecting a particular importer 18 from the list. After inputting the importer 18 data, the customs broker 22 may select 172 the "Update" link. Selection of the "Update" link links the customs broker 22 to the importer 18 and allows the importer's 18 account information to be displayed on the website.

Various informational fields may be included on the "Importer Detail" page 162 of FIG. 5l. The importer's name will generally be included at the top of the page. This field is protected from modification at all times. When the page is accessed in the add mode, there will be a list of available importer names that the user must select from. The list may be built into the "Importer Name" field. Selecting a name from that list will automatically populate the other fields. The list only includes names of importers 18 that do not already have access to the system. For those customs brokers 22 wishing to establish a relationship with an importer 18 who already has access to the system, they must get someone from the importing organization to establish the relationship.

The Federal Importer Identification Number (FEIN) is typically listed on the "Importer Detail" page 162. The U.S. Customs Service 26 assigns FEINs to importing organizations. An FEIN may be an importing organization's IRS Number either by itself or with an additional two-byte prefix. The additional two-byte prefix may be used to identify different divisions of an importing organization that have the same IRS number, but are represented to the U.S. Customs Service 26 as separate trading entities. This field is not modifiable. The importing organization's address, primary contact, and phone number are typically included on this page, as well as any other pertinent or desired information may be included on this page. The address, primary contact, and phone number fields typically are modifiable.

Referring again to FIG. 4a, after a user logs on, if the system determines 174 that the user is a customs broker 22, the system may display a "View Importer List" page 176 as shown in FIG. 5m. The customs broker's 22 name is included at the top of this page. A table listing information related to approximately ten importers 18 that the customs broker 22 represents might be included on this page. The list may be in alphabetical order or in any other convenient order. Since a customs broker 22 may represent hundreds or even thousands of importers 18, some form of a paging or scrolling function may be incorporated into this page.

The table of importer 18 information may include various information related to each importer 18 listed, for example, an importer's 18 name, an importer's identification number, the total number of accounts that the customs broker 22 has with the importer 18, and the total balance for all accounts that the customs broker 22 has with that importer 18. The total number of accounts that the broker 22 has with an importer 18 may be a subset of the entire number of accounts that the importer 18 has created.

A search function may be included on this page to allow users to search through the table for various information. When a search is performed, search results may be returned to the user ten results at a time, or in any other convenient format.

A field is included on the "View Importer List" Page 176 of FIG. 5m for the customs broker 22 to add or read a list of reminders. These reminders typically pertain to the listed import accounts. Reminders can be formatted to automatically expire after a "date of action" passes. A link may be included on this page titled "Add Importer". A user may select 178 the "Add Importer" link. Selection of this link causes the system to display the "Importer Detail" page 162, as discussed above.

Referring again to the "View Importer List" page 176 of FIG. 5m, each importer 18 name in the "Importer Name" Column of the table is a link. A user may select 178 an "Importer Name" link. Selecting the link for a particular importer name causes the system to display an "Importer Detail" Page 162 for that particular importer 18.

Each field in the "accounts" column of FIG. 5m is a link. Selection of an "accounts" link causes the system to display a "View Accounts List" page 134.

Figure 5N:
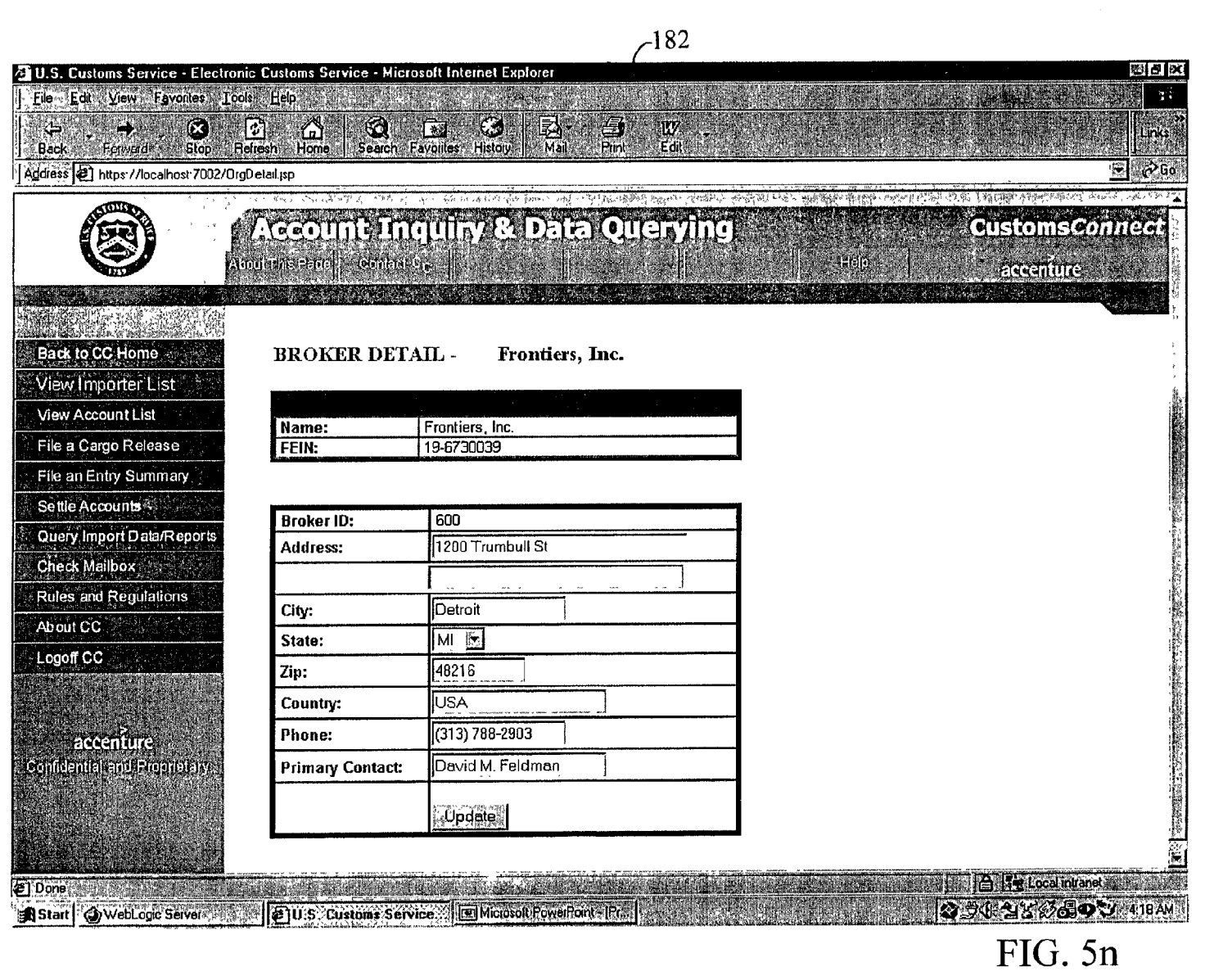

Referring still to the "View Importer List" page 176 shown in FIG. 5m, the field containing the broker's name is a link. A user may select 180 this "Broker's Name" link. Selecting that link causes the system to display a "Broker Detail" page 182 as shown in FIG. 5n. When the "Broker Detail" page 182 is accessed in this manner, the user may be allowed to either view or modify the information on that page.

The "Broker Detail" page 182 includes various information regarding a particular customs broker 22 including, for example, the broker's name, the broker's identification number, the broker's federal employee ID number (FEIN), the broker's address, the broker's phone number, the name of an employee or officer in the organization who is responsible for the organization's dealings with the system, and any other pertinent information related to the broker. Certain fields (e.g.

broker's name, broker's identification number, federal employee ID number) may not be modified from this page. Other fields (e.g. address, contact name, phone number, etc.) however, may be modified from this page.

If a customs broker 22 desires to make any modifications to the information shown in the "Broker Detail" page 182, the customs broker 22 may enter 184 the modifications and select 186 the "Update" link. Since the information on the "Broker Detail" page 182 is contact information for the entire organization, it will typically not be modifiable by most users in the organization. Determination of whether a particular user may enter modifications to this page may be made based on the password entered at logon, or by implementing any other convenient method. The information about the broker 22 included on a "Broker Detail" page 182 is stored on a database in the system.

Referring again to FIG. 4a, following a user's logon, the system may determine 254 that the user a supplier, carrier/freight forwarder, surety agent, banker, or other user. In that case, the system customizes 256 the available system data accordingly.

Figure 5O:
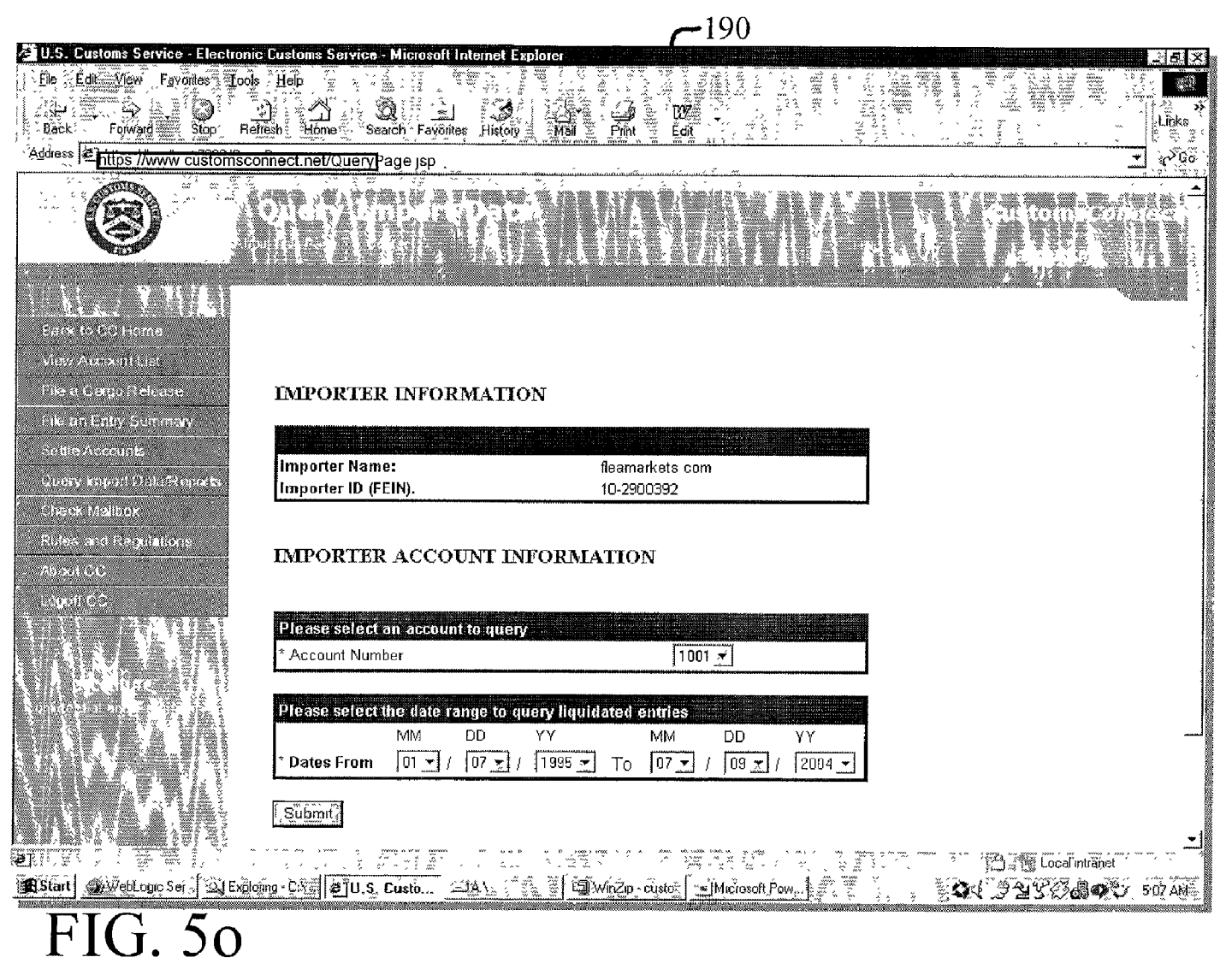

A user may access the "Query Import Data" page 190 of FIG. 5o in any one of several different ways, as shown in FIG. 4a-4j. The "Query Import Data" page 190 allows users to select varied information from databases for display. Listed at the top of the page is an importer name and importer ID number. The page prompts the user to make selections to identify the information that they would like to see.

Some of the queries that the user may want to see include, for example, all the transactions of a particular type for a given month, all the transactions that have a particular status, or all entries that have a particular product type. A user may also query liquidated entries in a given account within a given range of dates. The page may be set up to automatically prevent the user from generating poor performing queries. Also, limits may be imposed on which tables and fields the user can select from. The available query parameters may be modified.

The "Query Import Data" page 190 illustrated in FIG. 5o includes two available query parameters, account number and date range.

When the user enters 192 all information and selects 194 the "Submit" link, the system may conduct a validation of the data to ensure that the selected fields have the correct data type entered. The system then displays a "View Query Results" page 196.

Figure 5P:
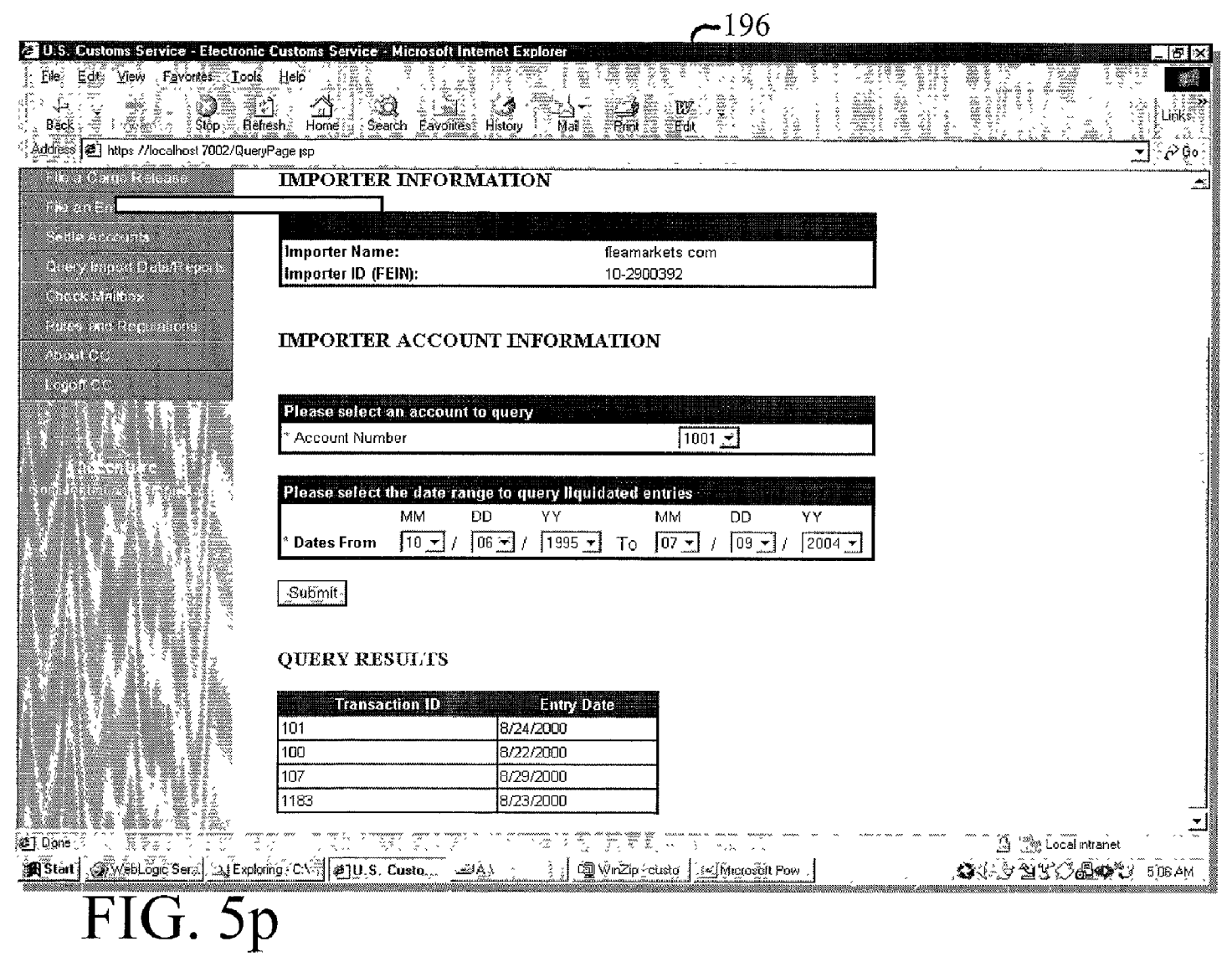

An exemplary "View Query Results" page 196 is shown in FIG. 5p. The "View Query Results" page 196 provides the information requested by the user in the format specified in the "Query Import Data" page 190. The importer name and the importer ID number are typically listed at the top of the page. The query results are included in tabular format. The names of the fields are listed at the top of the column of data they represent.

The data in the table may be listed in an order specified in the "Query Import Data" page 190. The user may re-sort the data by selecting the heading of the individual column the user wishes to sort by. If the user does not specify a sorting order, the system lists the data in chronological order based on the date of the transaction. The user may select 198 a "Download" link from this page. Selection of the "Download" link will download the data from the table into a spreadsheet format (e.g. Excel).

The system also provides users with the ability to file U.S. Customs Service 26 forms, as required. For example, a user may file a Cargo Release Form by using the system. The user may access a "File a Cargo Release" page 202 in a number of ways, as outlined in FIG. 4a-4j. For example, the user may select 200 a "File A Cargo Release" link from a sidebar menu that is present on several different pages.

Figure 5Q:
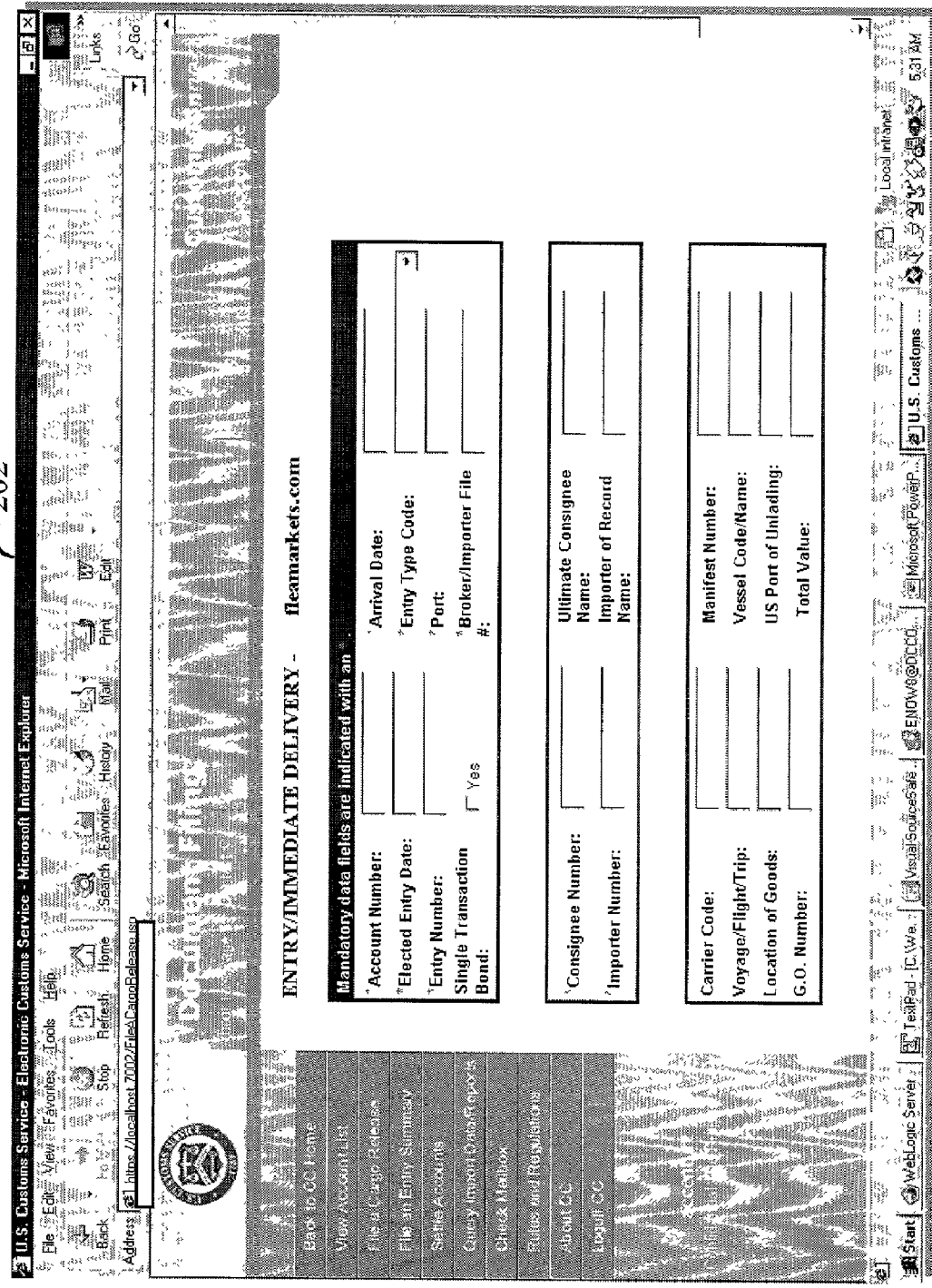

An exemplary "File a Cargo Release" page 202 is shown in FIG. 5q. The "File a Cargo Release" page 202 includes the fields for entering data required to file information on goods crossing a border. Filing this document allows the U.S. Customs Service 26 to determine whether the cargo is suitable for release in the country.

The exemplary "File a Cargo Release" page 202 shown in FIG. 5q corresponds to U.S. Customs form 3461, which is called an Entry/Immediate Delivery Form. It allows for the immediate release of goods upon reaching the border. This document may be filed while goods are en route. The user enters 204 data into of the fields of this page for the products being imported.

After entering 204 the information in all the required fields, the user selects 206 "Enter". The system then displays a "Form Submission" page 208 as shown in FIG. 5u, which provides a confirmation number. The confirmation number corresponds to the document's unique transaction identification number. This confirmation number provides the U.S. Customs Service 26 personnel a simple means of referencing a transaction if a user has an issue to resolve.

Referring again to the "File a Cargo Release" page 202 of FIG. 5q, a number of other fields are included on the page. The "Arrival Date" is the date that the shipment is expected to actually arrive at the customs port of entry based on the best available evidence that the importing carrier brought or will bring the shipment to the port of entry. If the goods arrive by vessel, the arrival date is the date on which the vessel enters the port limits with the intent to unlade. If the goods arrive by air, the arrival date is the date the air carrier landed within the port. If the goods arrive by inland transport, the arrival date is the estimated date of arrival at the port of destination.

The "Elected Entry Date" field may include a date different than the "Arrival Date" for the release. This may be a date elected by an importer or broker. If the field is not populated, the arrival date is assumed to be the entry date. This field is typically in a six digit numerical format.

The "Entry Type Code" field includes a two digit numeric code indicating the type of entry being filed. The first digit typically identifies a general category and the second digit identifies a specific processing type. For example, the entry type code 01 indicates "consumption," meaning that the goods are being brought into the country for immediate sale. The entry type code 02 indicates "quota" which means that the goods are being brought in as a result of a quota. The entry type code 23 indicates "temporary in bond." These goods are brought in temporarily, usually for display, marketing or repair. Such goods typically must be exported within a year of entry. The entry code 21 indicates, "warehouse." These goods are not brought in for immediate sale. Warehoused items may be brought in for repackaging or be stored to delay payment of duties until a buyer exists. These goods typically must be either exported or withdrawn for consumption within 5 years of the date of entry. The entry code 09 indicates "reconciliation". The importer or broker chooses this type of entry when the classification of the goods is uncertain.

The "Entry Number" is the actual transaction number for the entry. This is typically an eleven character code, structure as follows: XXX-NNNNNNN-C, where the X's represent an entry filer code assigned to the broker or importer by customs services, the N's are digits assigned by the entry filer in any manner convenient as long as the same number is not assigned to more than one transaction, and the C is a check digit.

The "Port" field is a four digit numeric code identifying the port where the entry is being filed. The "Single Transaction Bond" field may be marked with an "X" if a single transaction bond is filed with the entry. The "Bond Number" field includes the bond number for insuring the shipment of the goods. This field is only populated if a one-time usage bond is used. Most large importers and brokers use continuous bond and in that case, this field would not be used.

The consignee is the ultimate purchaser of the goods. The "Consignee Number" field may be, for example, the social security number, an IRS assigned, or a customs assigned number for the consignee.

The "Account Number" may be a number designated by the importer 18 to represent their division of trade processing related to the entry. The "Importer Number" is also included on this page. The "Ultimate Consignee Name" field identifies the agent or ultimate seller of the products for the account of the foreign exporter (the consignor). The "Importer of Record Name" may be included on this page. The "Carrier Code" identifies the transporter of the goods. Each carrier has a specific code registered with U.S. Customs. This code will identify the carrier and the type of transport.

The "Voyage/Flight/Trip" field will identify the number associated with the voyage, flight, or trip of the importing carrier (e.g. American Airlines flight 1103). The "Location of Goods—Code(s)/Name(s)" field includes the location identification number where the merchandise is awaiting release. The "Vessel Code/Name" field identifies an alphanumeric code assigned by the Bureau of the Census to the importing carrier. The "U.S. Port of Unlading" field includes a numeric code that identifies the U.S. port at which the merchandise was unlade from the importing carrier. Sometimes, goods will be brought into the U.S. through one port and then transported inland to another port in order to be declared. In such a scenario, this field would be populated.

The "Manifest Number" is a unique numeric identifier assigned to the shipments arriving in air and vessel carriers. The "G.O. Number" field is only used when goods are held by customs in a general order (G.O.) warehouse upon arrival. Otherwise, this field is not populated. The "Total Value" field identifies the invoice value of the shipment. This includes the total value of all the goods shipped, based on customer invoices, supplier costs and freight costs. The "Description of Merchandise" field includes a short description of the goods. The "Country of Origin" field identifies a code that identifies the country of origin. The country of origin may be the country of manufacturer, production, or growth of the goods. The "Manufacturer ID" field includes an identification number representing the manufacturer. This page may also include provisions to identify clearances obtained from other government agencies.

The system may also be used to file entry summary documents. A user may access the "File An Entry Summary Document" page 212 in many different ways, as detailed in FIG. 4a-4j. For example, a user may select 210 a "View an Entrance Summary Document" link from the sidebar menu of any of several pages that include such a link. Many fields are included in a "File An Entry Summary Document" page 212, therefore, there are two screen shots shown in the attached figures that describe such a page's functionality.

Figure 5S:

Exemplary "File An Entry Summary Document" pages 212 are shown in FIGS. 5r & 5s. A "File An Entry Summary Document" page 212 contains detailed information about a shipment of goods into the U.S. It also uses Harmonized Tariff Codes (HTC) to determine the duties. The page refers to a table that contains relevant calculations for the HTC. The system can automatically calculate the required duties based on a retrieved formula, which relies on the quantity and value of the items imported.

The "File An Entry Summary Document" page 212 corresponds to U.S. Customs form 7501. The fields on this page and other pages may be enabled with a "glide over" help feature, which provides information on the fields and how to populate them. Some of the fields will be initially populated based on the information from an organization's profile, which is established during system registration. The user can also choose a supplier from a list they specified in their organization profile. The user must populate such information as the HTC for products being imported, the quantity, value and port of entry. The user may select from a list of available HTC, which they have declared in their organizational profile. Based on the selected HTC, the system calculates the required duties associated with the shipment.

The following fields of information are included on the "File an Entry Summary" page. The "Entry Number" is the actual transaction number for the entry. This is typically an eleven-character code, designed as follows BBBNNNNNNNC, where the B's are a broker's identification code, the N's are digits assigned by the broker to identify the entry, and the C is a check digit. An "Entry Type Code" is listed on this page. Entry Type Codes were discussed earlier. An "Entry Summary Date" is include on the page. This is the date that the Entry Summary is actually filed with Customs. The "Entry Date" is the date on which the entry document was filed (if applicable). Normally, it is the date goods are released, except for immediate delivery, quota goods, or where importer/broker requests another date prior to release. The "Port Code" is the port of entry for the shipment.

The "Bond Number" is an identification number assigned to the bond that ensures payment to the government for shipment of the goods. This may typically be either a continuous bond number or a single entry bond number. For importers that use continuous bond numbers, this field would automatically be filled with the continuous bond number. The "Bond Type Code" is a code used to identify what type of bond is used. For example, the entry may be a government type of entry, not requiring a bond, the bond may be continuous, or the bond may be a single transaction bond.

The "Account Number" is the number designated by the importer to represent their division of trade processing related to the entry. The "Ultimate Consignee Name and Address" is the name and address of the ultimate seller of the product. The "Consignee Number" is the number assigned by the IRS, Social Security, or Customs Service to the consignee. The "Importer of Record Name and Address" is included in this page. The "Exporting Country" is the country from where the goods have been shipped. The "Export Date" is the date on which the goods left the exporting country. The "Country of Origin" field includes the country where the product or its primary components were manufactured. This field can read "multiple" if the parts were manufactured in different countries. The "Missing Documents" field indicates and lists any documents not available at the time of filing the entry summary. The "I.T. Number" is the In-Bond Entry Number.

The "B.L. or A.W.B. Number" is the number assigned on the manifest by the international ocean or air carrier delivering the goods. Completion of this field is not necessary for modes of transport other than sea or air. The "Mode of Transportation" records the method of transportation by which the imported goods entered the port of arrival from the last foreign country. A "Manufacturer ID" is the supplier ID number with the first two characters representing the country. The "Importing Carrier" is the name of the carrier bringing the shipment into the country. For goods arriving in the U.S. by vessel, the "Foreign Port of Lading" is a five digit numeric code for the foreign port at which the goods were actually laden on the vessel that carried the merchandise to the country. The "Location of Goods/G.O. Number" is a code that indicates the location where the goods are awaiting release. The location may be a general order (G.O.) warehouse, in which case a G.O. number would be entered.

The "U.S. Port of Unlading" indicates the location where the goods become available for examination. The "Import Date" is included on this page. The "Line Number" refers to a commodity from one country, covered by a line which includes a net quantity, entered value, HTS number, charges, and rate of duty and tax. This number will be automatically generated sequentially. A "Description of Merchandise" is included on this page. The "HTSUS Number" is the Harmonized Tariff Code associated with goods brought into the country. The code is used to classify the goods for the purpose of establishing duty rates and special duties, determining admissibility, determining other government agency requirements, determining applicable restrictions, compiling statistical and trade data, etc. The "ADA CVD Case Number" is the case number for anti-dumping activities or counter-vailing duties.

The "Gross Weight" is the gross shipping weight for articles imported by all modes of transportation. The "Manifest Quantity" is the quantity covered by the informal entry by Bill of Lading/AWB number, using the smallest exterior package unit. The "Net Quantity in T.S.U.S.A. Units" is the quantity of the goods in units as specified in the HTS. The "Entered Value" is the price paid or payable for the goods. The "Charges (CHGS)" is the aggregate cost of freight, insurance, and all other costs incurred in bringing the merchandise from alongside the carrier at the foreign port of exportation and placing it alongside the carrier at the first U.S. port of entry. The "Relationship" field indicates whether the transaction was between related parties. The "T.S.U.S.A. Rate" is the rate designated by the Department of Commerce. This value is automatically determined based on the case number entered. The "I.R.C. Rate" is the tax rate for the classified item as designated in the HTS or the Customs approved metric conversion tax rate. This is automatically calculated from tables. The "Visa Number" identifies a restraint imposed by the exporting country in agreement with the U.S. to limit the number of a particular type of a product to be exported.

The user may enter 214 all pertinent data and select 216 a "continue" link on the page. Selecting this link causes the system to display a "Calculated Entrance Summary Document" page 218.

Figure 5T:
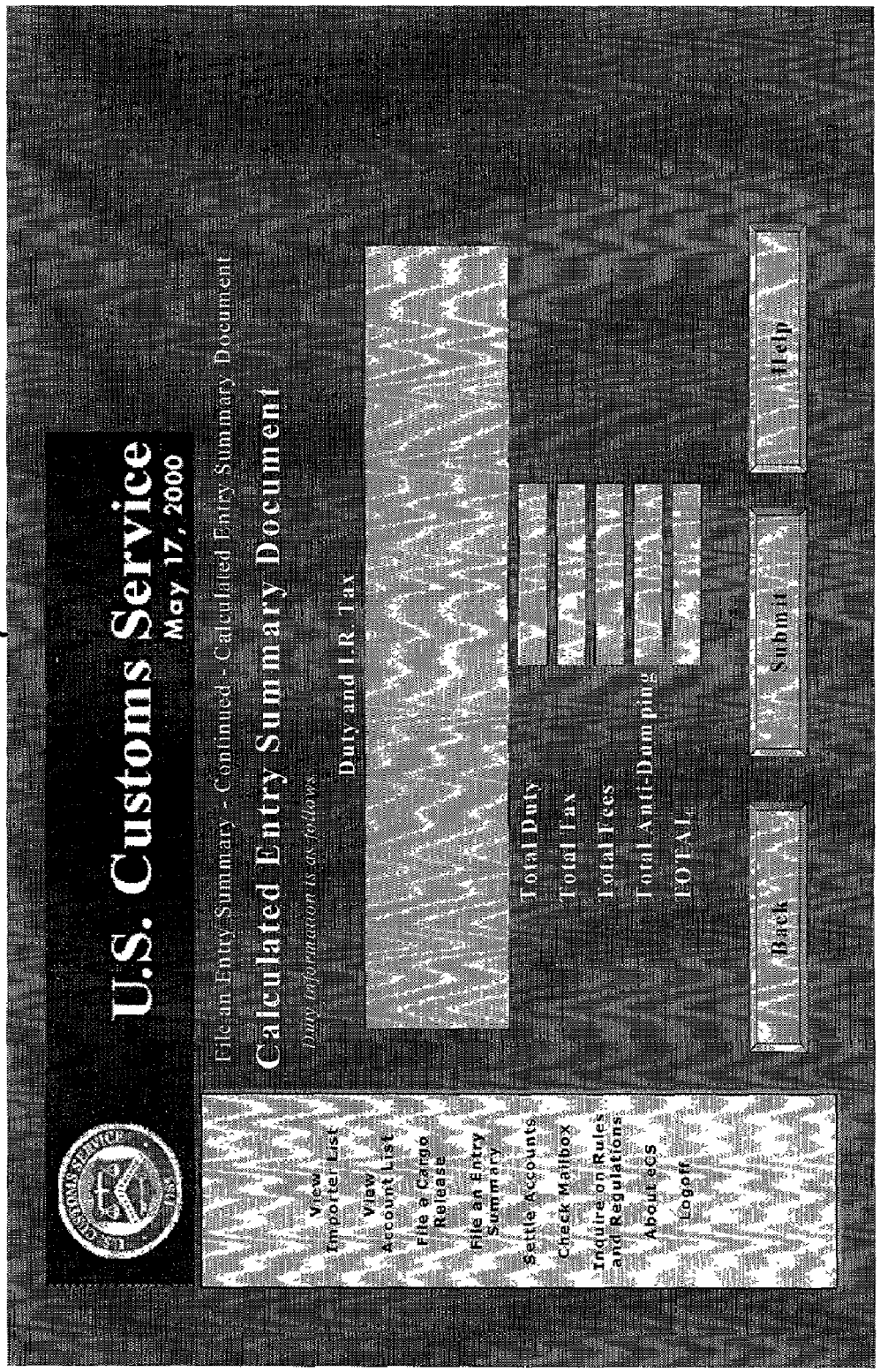
Figure 5U:
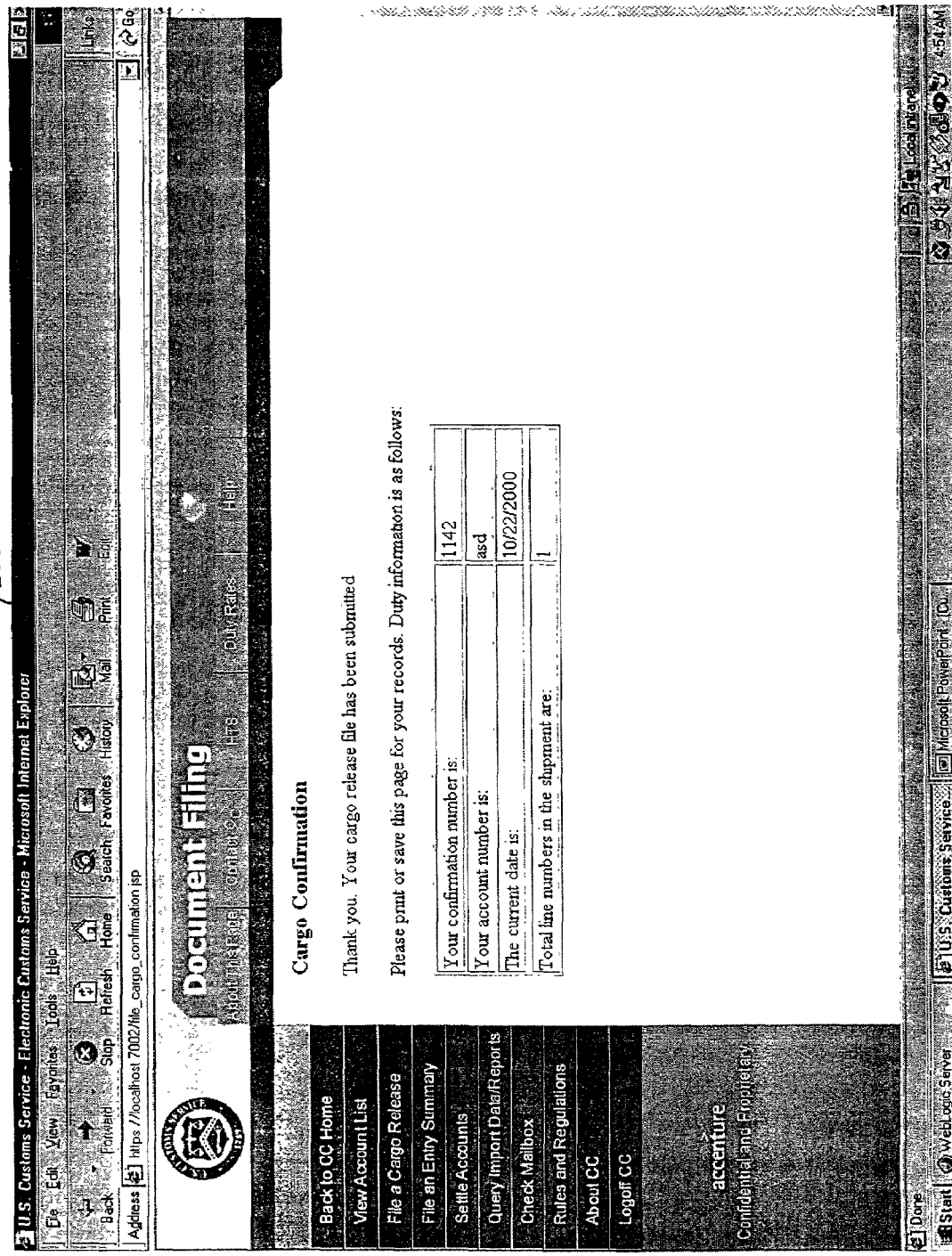

The "Calculated Entry Summary Document" page 218 provides the calculated tariffs and duties based on information provided by the user on the "File An Entry Summary" page 212. An exemplary "Calculated Entry Summary Document" page 218 is shown in FIG. 5t. The totals appear on the page as duties, taxes, and other fees.

The "Duty and I.R. Tax" field is the estimated HTS duty, antidumping duty, countervailing duty, I.R. tax, and any other fees or charges calculated by applying the rate times the dutiable value or quantity. The "Total Duty" field includes a summation of all of the duty associated with the entry (excluding antidumping and countervailing duty). The "Total Tax" field includes a summation of all the tax associated with the entry. The "Total Fees" field includes a summation of the total fees for the shipment. There are generally two types of fees: a merchandise processing fee and a harbor maintenance fee. The "Total Antidumping" field provides the total amount of additional duty imposed from antidumping and counter-vailing cases. The "Total" field includes the entire amount that must be remitted for the entry.

After reviewing the information on the page, the user may select 220 the "Submit" link. Selection of that link will cause the system to display a confirmation number. The confirmation number corresponds to the document's unique transaction ID. This provides Customs personnel a simple means to inquire on the transaction if the user has an issue with the document.

The system may be used to settle accounts. The "Settle Accounts" page 224 (FIG. 5v) may be accessed in various ways as outlined in FIG. 4a-4j. For example, a user may select 222 a "Settle Accounts" link from the side bar menu of any page that offers such a link. The "Settle Accounts" page 224 is used to remit payments. The balance due is initially included in the "Enter Payment Amount" field. The user may choose to modify 226 the payment amount, allowing them to remit partial payment or to pay more than the balance due. A table is displayed, listing the various accounts and their outstanding balances.

The list is organized on an importer level, so the broker must go to each individual importer's page to make payments. If everything is in balance for a given importer 18, the user has the option to make an estimated payment or a pre-payment. The table would remain blank in the case of estimated payments or pre-payments. Included in the table several columns, including the account names, the account numbers, the end dates, which identify the end date of the period associated with that account, and the balances due. The data in the "balances due" column considers both collections and liabilities. It is zero when the user is making a pre-payment or an estimated payment.

After the user enters all necessary payment information, the user might select 228 the "Submit" link. Selection of this link generates an electronic payment transaction identification number/confirmation number for the payment. The system then displays a "Payment Confirmation" page 230 as shown in FIG. 5w. This page indicates that payment has been recognized and will be credited to the proper account or accounts. The page indicates the total amount remitted and provides a payment confirmation number to the user. The payment confirmation number may correspond to a transaction identification number or the statement number on a bill. This provides U.S. Customs Service 26 personnel a simple means to inquire on the transaction if the user has issue with the payment. The actual payment may be extracted electronically from an organization's account, or an electronic bill may be generated and sent to the organization's mailbox. A check might then be sent by the importing organization along with a physical copy of the bill. In that case, actual payment updates would not be applied until the check is received.

Figure 5V:
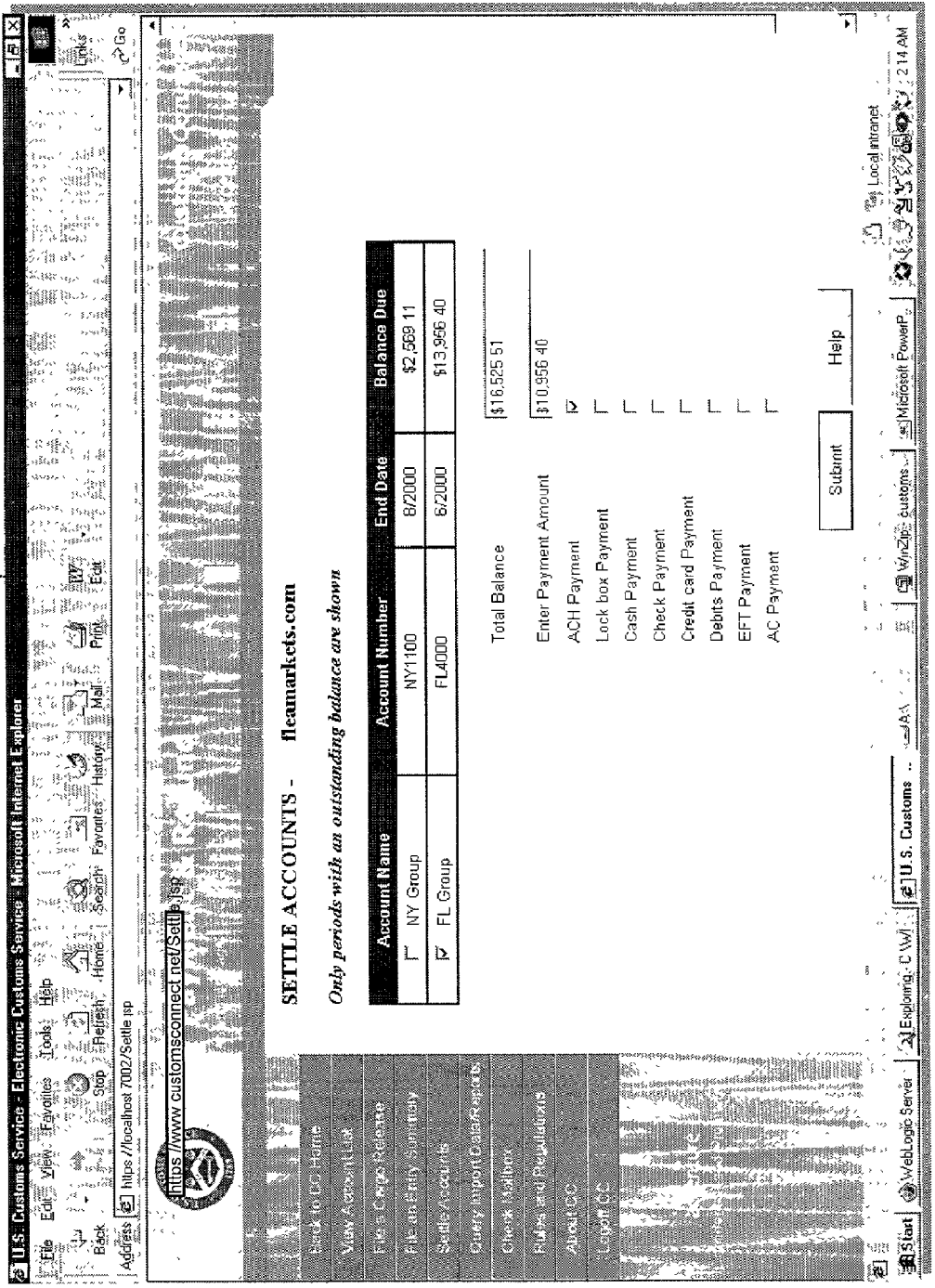
Figure 5W:
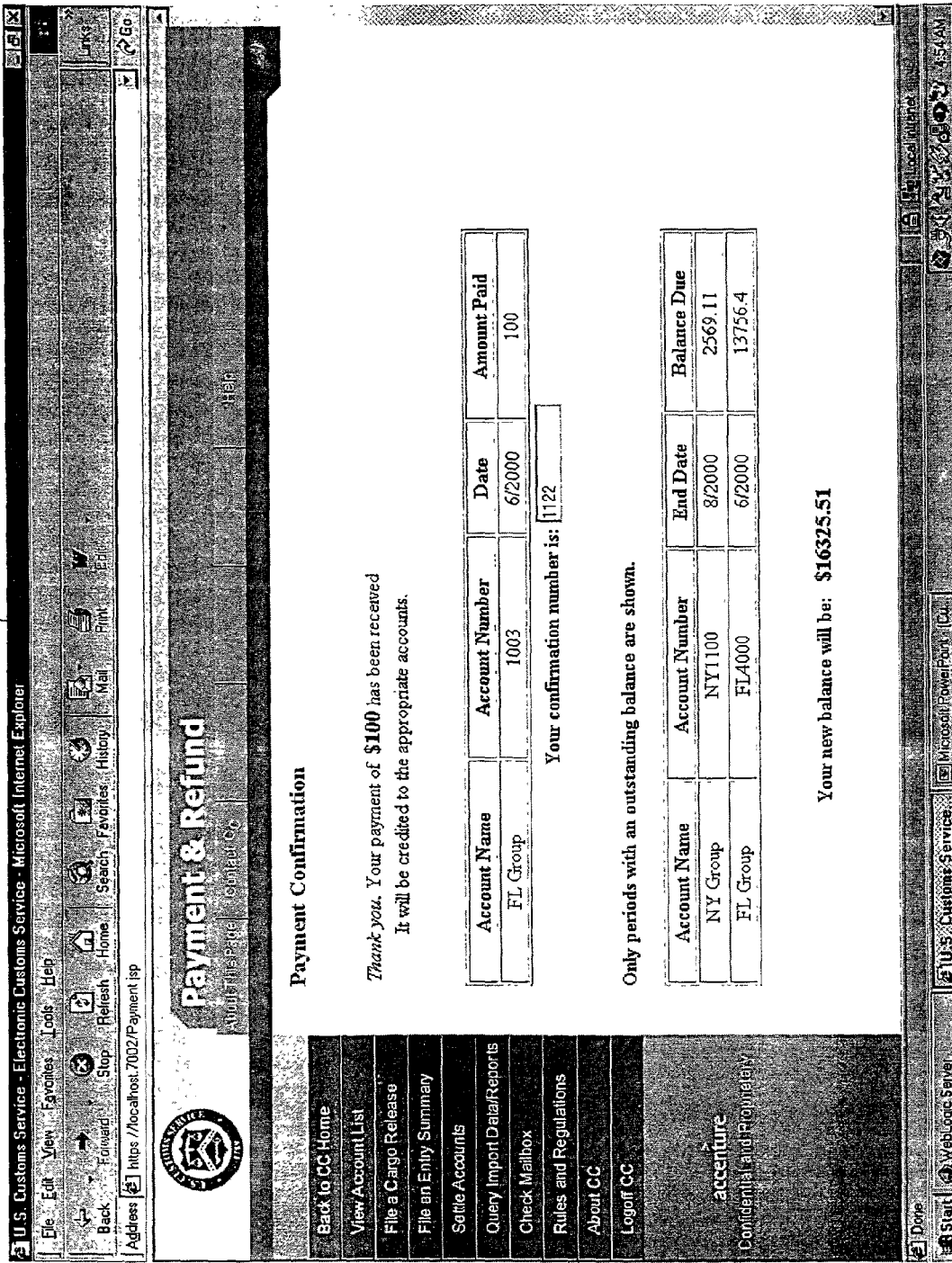
Figure 5X:
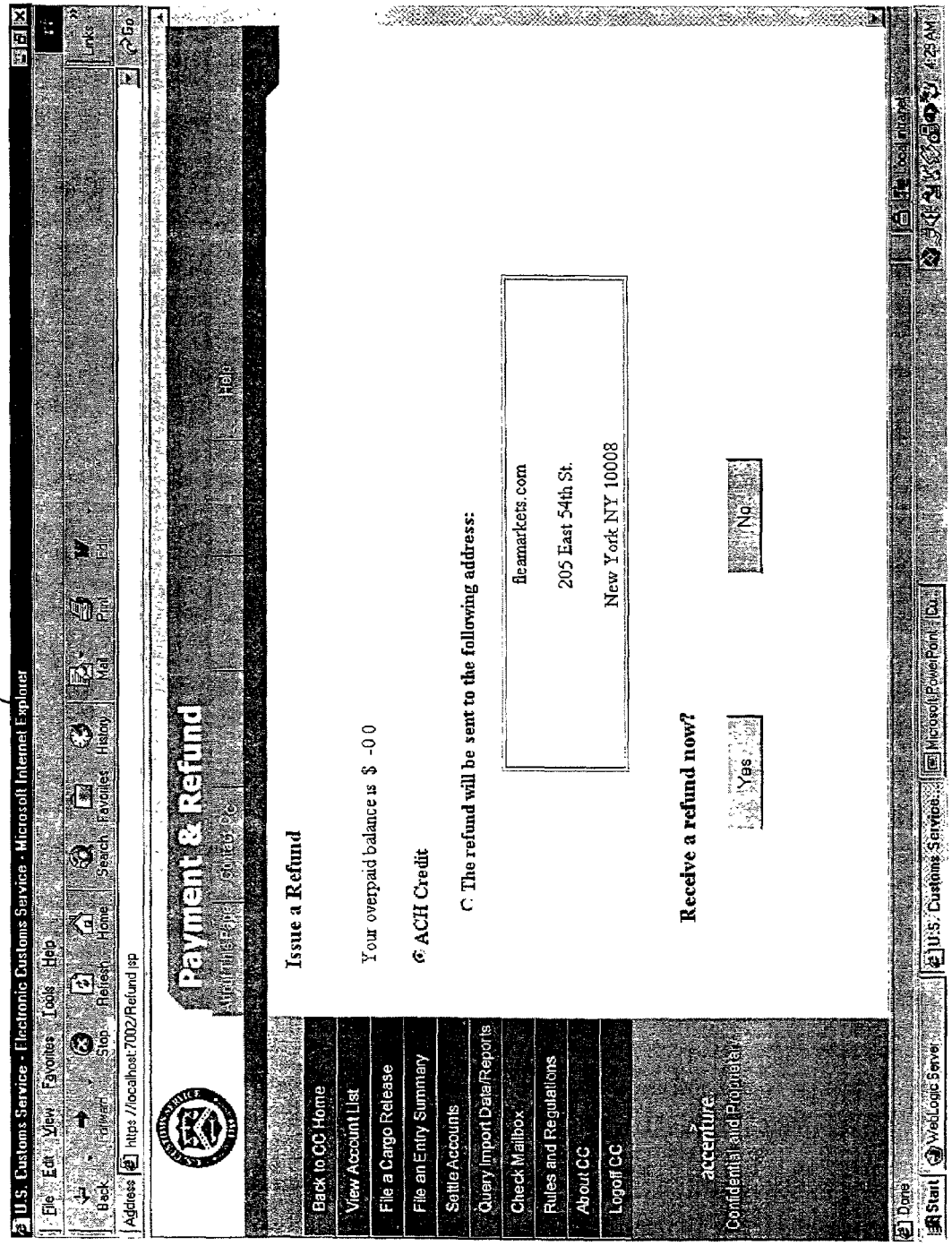

Referring again to the "Settle Accounts" page 224 of FIG. 5v, if an importer's 18 account is overpaid, the user may select 232 a "Refund" link. Selection of the "Refund" link causes the system to display an "Issue a Refund" page 234. An exemplary screen shot showing an "Issue a Refund" page 234 is shown in FIG. 5x. The "Issue a Refund" page 234 displays the overpaid balance and an address to which a refund check can be sent. The user can either select 236 "Yes" to have the refund sent to the address listed, or to have the refund electronically registered as a system credit. The address field is not modifiable from this page. The address is listed with the organization profile. It must be changed through updating procedures. Establishing the organization's accounts is typically performed external from the system. In some instances, only the importers 18 may have access to the "Issue a Refund" page 234. However, if a custom broker 22 handles all facets of a transaction for an importer 18, they may also have access to this page. When a refund request is submitted, a confirmation number appears at the bottom of the screen. This is a system-generated transaction ID number.

The system includes provisions for the user to register a bond associated with surety agent and importer 18 of record. The system also includes provisions to enable the user to verify bond information after it has been submitted.

Figure 5Y:
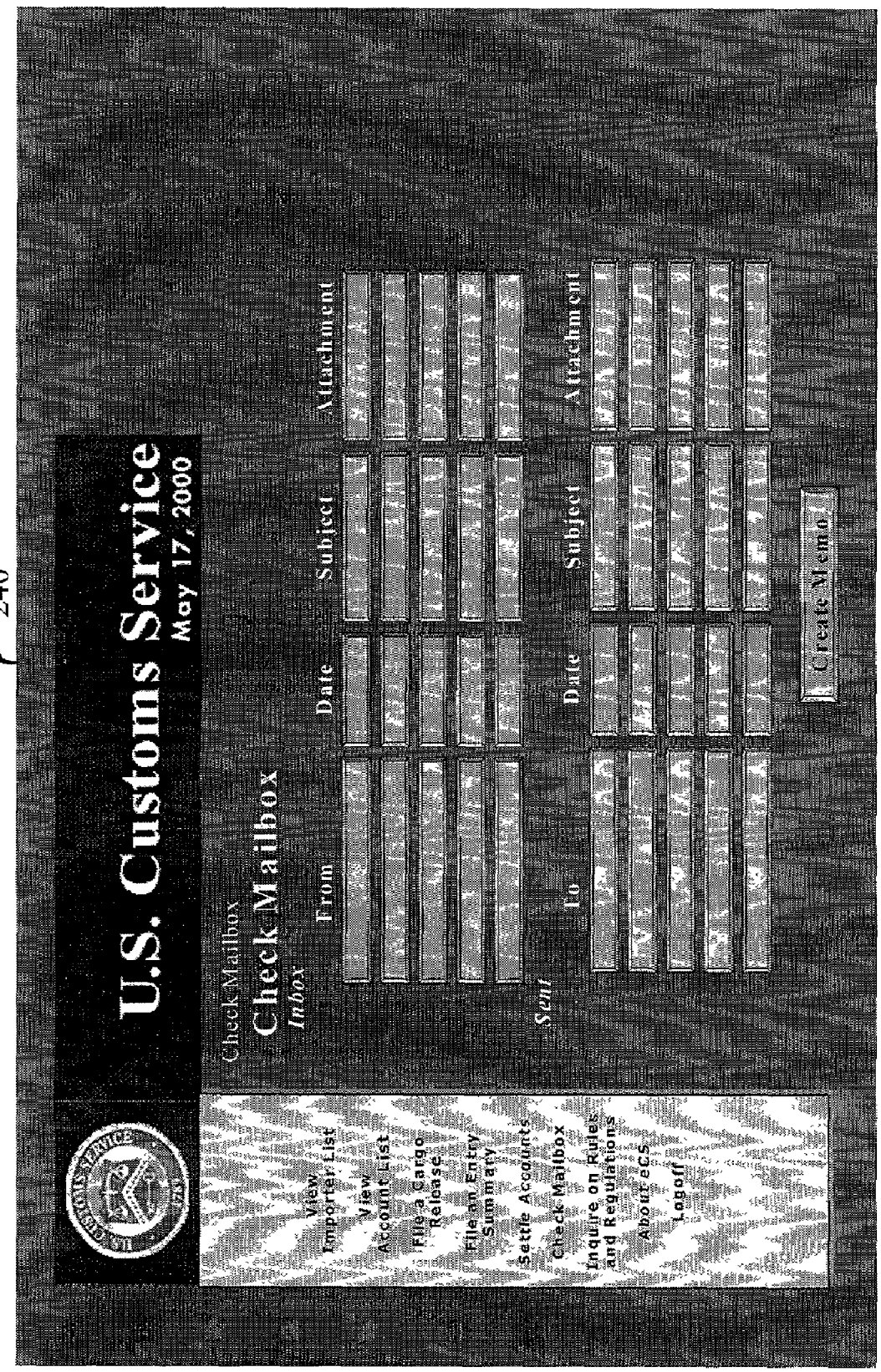

The system also includes a mailbox section. A user may access the "Check Mailbox" page 240 in a number of different ways as detailed in the attached figures. For example, a user may select 238 a "Check Mailbox" link from a sidebar menu on any of the pages that include such a link. An exemplary "Check Mailbox" page 240 is shown in FIG. 5y. The "Check Mailbox" page 240 typically includes all Customs related correspondence received and sent by the user. The "Inbox" list indicates the Customs division responsible for the message, the date the message was sent, the subject of the message, and any attachments that were included with a message. A similar table exists for Sent items. The "Sent Items" table includes the person the message was sent to, the date, the subject and whether any attachments were sent with the message. The various fields are links. Selection 242 of either a "From", "To", "Date", or "Subject" link will cause the system to display a "Read Message" page 244. Selection 246 of an "Attachment" link causes the system to display 248 the attachments. The user may select 250 the "Create Memo" link, causing the system to display a "Create Memo" page 252.

Figure 5Z:
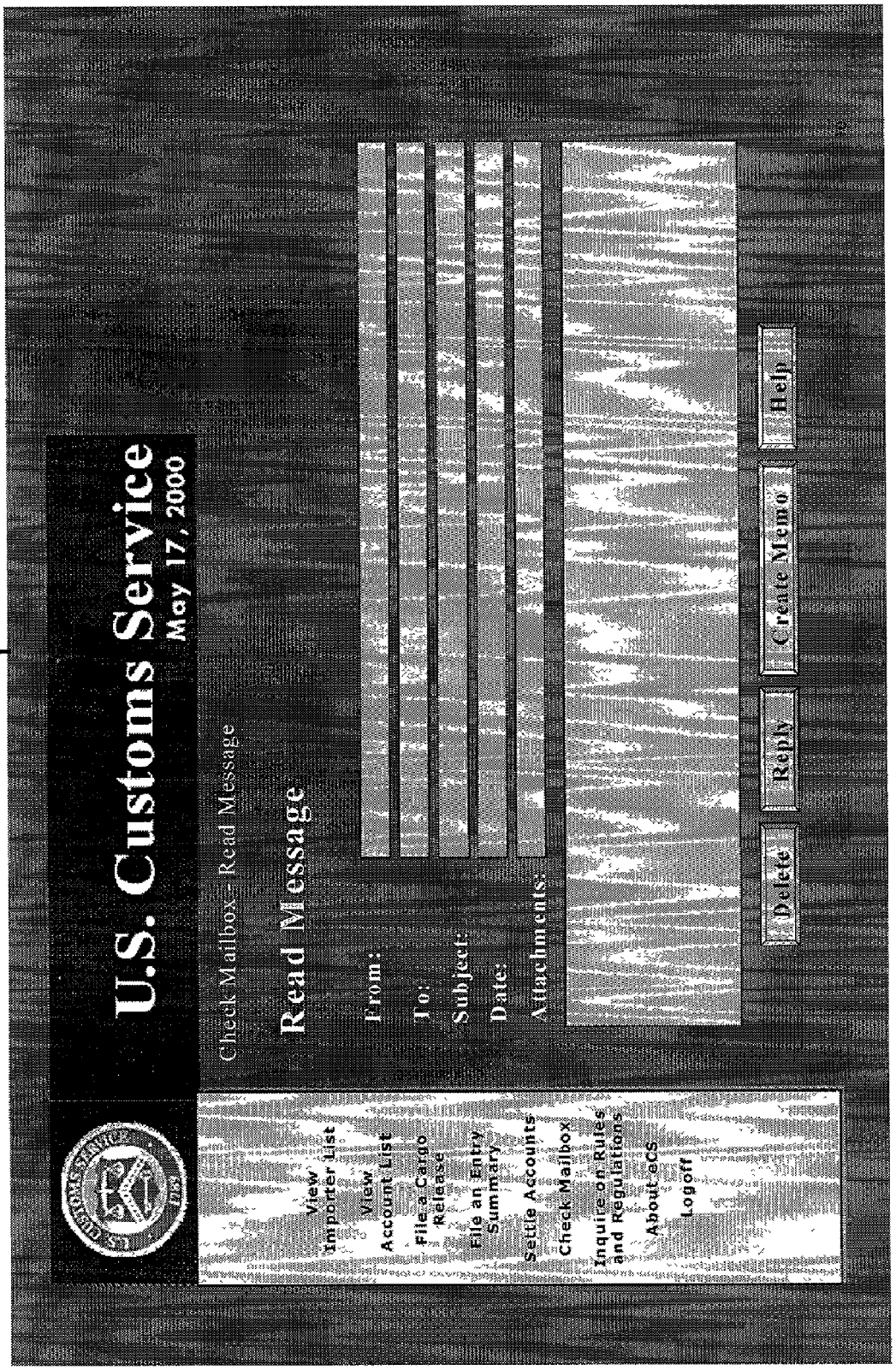
Figure 5A:
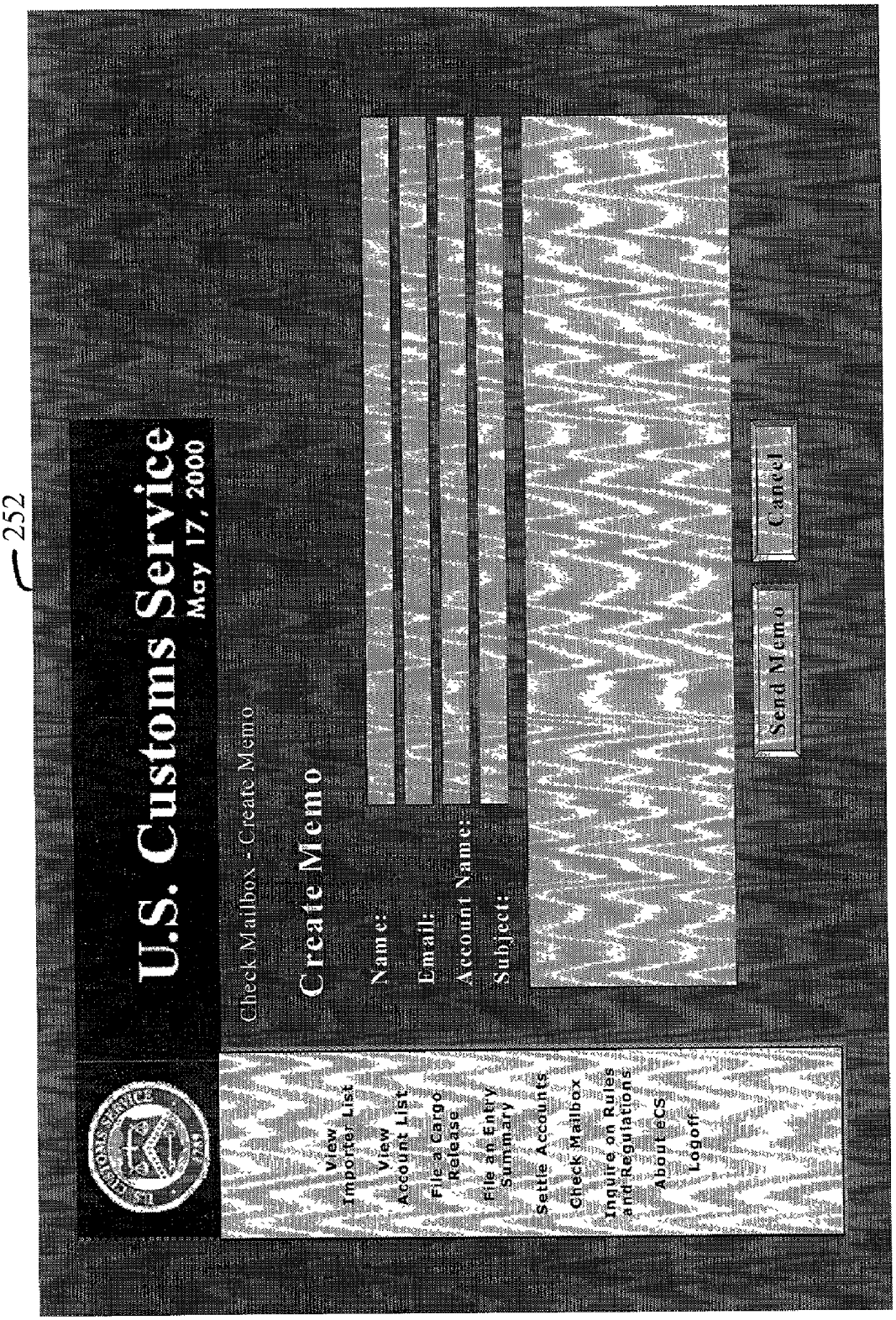

An exemplary "Read Message" page 244 is shown in FIG. 5z. The "Read Message" page 244 provides the text of the message selected on the message list. The page indicates if an image is attached to the message, and allows the user to open the image. The user may select the "Delete" link to delete the message. The user may select the "Reply" message, which allows the user to correspond directly with U.S. Customs. The user may select the "Create Memo" link, which causes the system to display the "Create Memo" page.

An exemplary "Create Memo" page 252 is shown in FIG. 5aa. The "Create Memo" page 252 allows the user to submit questions and comments to the U.S. Customs Service. The user's name and email address automatically populate these fields. Fields are also provided for the account name and the subject. The page also includes a free text area for writing the text of the message. The user may select the "Send Memo" link. This causes the system to send the memo to the recipient. The user may select the "Cancel" link. This causes the system to display the "Check Mailbox" page without sending the memo.

The system also includes an "Inquire on Rules and Regulations" page 260. This page may be accessed in many different ways as detailed in the attached figures. For example, the user may select 258 a "Rules" link from the sidebar menu of any page that includes such a link. This page provides information about the import process to the users. It can incorporate searching functions, index functions and other common or useful functions to assist the user in obtaining import information.

Other implementations are within the scope of the following claims. For example, the techniques described herein may be adapted for use in countries other than the United States. Additionally the screen shots in FIGS. 5a-5aa are exemplary only and may be modified according to a user's specific needs.

Various features of the system may be implemented in hardware, software or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

What is claimed is:

1. A method of providing multiple parties access to customs information, the method comprising:
    maintaining an account-based database of customs information that associates individual import transaction entries with related importer accounts corresponding to one or more importers of goods, wherein:
        the import transaction entries describe import transactions that involve the importation of goods into a country and an individual import transaction entry includes:
            a record of goods imported into the country as part of an individual import transaction, and
            a record of a financial balance due to a customs agency for duties, taxes, or other fees levied by the customs agency on the goods imported into the country as part of the individual import transaction; and
        the database of customs information associates individual import transaction entries with corresponding importer accounts based on the importers responsible for the import transactions described by the import transaction entries;
    receiving, at a web-based interface, a non-importer's log-in information;
    verifying the non-importer's log-in information;
    receiving a request from the non-importer to create a new importer account for a particular importer;
    based on the non-importer's verified log-in information, determining if the particular importer is an importer for whom the non-importer is authorized to act as an agent;
    based on a determination that the particular importer is an importer for whom the non-importer is authorized to act as an agent, creating the new importer account for the particular importer;
    receiving a new import entry summary from the non-importer that corresponds to a new import transaction for which the particular importer is responsible, that is related to the new importer account, and that includes:
        an indication of a type of new goods being imported into the country as part of the new import transaction,
        a quantity of the new goods being imported into the country as part of the new import transaction, and
        a declared value of the new goods being imported into the country as part of the new import transaction; and
    in response to receiving the new import entry summary from the non-importer:
        calculating, based on the type, quantity, and declared value of the new goods being imported into the country as part of the new import transaction, a new financial balance due to the customs agency for duties, taxes, or other fees levied by the customs agency on the new goods being imported into the country as part of the new import transaction;
        generating a new import transaction entry that describes the new import transaction and that includes:
            a record of the new goods being imported into the country as part of the new import transaction, and a record of the new financial balance due to the customs agency for duties, taxes, or other fees levied by the customs agency on the new goods being imported into the country as part of the individual import transaction;

associating the new import transaction entry with the new importer account; and storing the new import transaction entry in the account-based database of customs information.

2. The method of claim 1 wherein:

receiving the new import entry summary from the non-importer includes receiving the new import entry summary in a format having a field for an account number used to identify the new importer account;

associating the new import transaction entry with the new importer account includes identifying, for the first time, the new importer account as the importer account to which the new import transaction entry corresponds based on receiving the new import entry summary in the format having the field for the account number; and storing the new import transaction entry in the account-based database of customs information includes organizing the new import transaction entry into an account-based format.

3. The method of claim 1 further comprising:

receiving an importer's tog-in information;

authenticating the identity of the importer based on the user's importer's log-in information;

identifying at least one importer account that corresponds to the importer from the account-based database of customs information; and providing on-line access to the identified importer account to the importer, wherein the account-based database of customs information enables the importer to access all of the import transaction entries associated with the identified importer account.

4. The method of claim 3 wherein the importer's log-in information comprises a password.

5. The method of claim 3 wherein the importer's log-in information is derived from an electronically recognizable identification card.

6. The method of claim 3 wherein providing on-line access to the identified importer account to the importer comprises providing access to a periodic account statement that includes:

all of the import transaction entries for a period of time, and a total balance due to the customs agency for duties, taxes, or other fees levied on the import transactions for the period of time by the customs agency.

7. The method of claim 1 further comprising enabling customs forms to be filed on-line.

8. The method of claim 1 further comprising providing access to additional customs information from a database that is not account-based.

9. The method of claim 1 further comprising:

receiving a request to input additional data, the additional data describing an additional transaction;

identifying a particular importer account to which the additional data corresponds;

organizing the additional data into an account-based format that corresponds to the particular importer account;

storing the additional data in the account-based database of customs information; and providing interactive access to the additional data to an authenticated user that corresponds to the particular importer account.

10. The method of claim 9 further comprising limiting access to an accessible portion of the account-based database.

11. The method of claim 10 wherein limiting access is based on information tat establishes an identity of a user.

12. The method of claim 9 further comprising processing at least payment receipt financial transactions and refund request financial transactions.

13. The method of claim 9 further comprising providing access to a periodic account statement and enabling modification of the format of the periodic account statement.

14. The method of claim 9 further comprising enabling customs forms to be filed on-line.

15. The method of claim 14 further comprising automatically calculating required payments due to the customs agency based on information entered in the customs forms.

16. The method of claim 9 further comprising providing limited access to a broker information database and to an importer information database.

17. The method of claim 9 further comprising providing limited access to a bond information database.

18. The method of claim 9 further comprising enabling modification of details of the account-based format.

19. The method of claim 9 wherein receiving the request to input additional data, and providing access to the formatted, account-based additional data are accomplished using a packet-switched, publicly accessible communications channel.

20. The method of claim 9 wherein the additional data comprises data related to importing a single shipment of goods.

21. The method of claim 9 wherein the account-based format comprises at least a single category under which the additional data can be categorized.

22. A computer program product, tangibly stored on a computer readable medium, for providing multiple parties access to customs information, the product comprising instructions operable to cause a programmable processor to:

maintain an account-based database of customs information that associates individual import transaction entries with related importer accounts corresponding to one or more importers of goods, wherein:

the import transaction entries describe import transactions that involve the importation of goods into a country and an individual import transaction entry includes:

a record of goods imported into the country as part of an individual import transaction, and a record of a financial balance due to a customs agency for duties, taxes, or other fees levied by the customs agency on the goods imported into the country as part of the individual import transaction; and receive, from a web-based interface, a non-importer's log-in information;

verify the non-importer's log-in information;

receive a request from the non-importer to create a new importer account for a particular importer;

determine if the particular importer is an importer for whom the non-importer is authorized to act as an agent based on the non-importer's verified log-in information;

create the new importer account for the particular importer based on a determination that the particular importer is an importer for whom the non-importer is authorized to act as an agent;

receive a new import entry summary from the non-importer that corresponds to a new import transaction for which the particular importer is responsible, that is related to the new importer account, and that includes:

an indication of a type of new goods being imported into the country as part of the new import transaction, a quantity of the new goods being imported into the country as part of the new import transaction, and a declared value of the new goods being imported into the country as part of the new import transaction; and in response to receiving the new import entry summary from the non-importer:

calculate, based on the type, quantity, and declared value of the new goods being imported into the country as part of the new import transaction, a new financial balance due to the customs agency for duties, taxes, or other fees levied by the customs agency on the new goods being imported into the country as part of the new import transaction;

generate a new import transaction entry that describes the new import transaction and that includes:
  a record of the new goods being imported into the country as part of the new import transaction, and
  a record of the new financial balance due to the customs agency for duties, taxes, or other fees levied by the customs agency on the new goods being imported into the country as part of the individual import transaction;

associate the new import transaction entry with the new importer account; and store the new import transaction entry in the account-based database of customs information.

23. The computer program product of claim 22, wherein:

the instruction operable to cause the programmable processor to receive the new import entry summary from the non-importer includes an instruction operable to cause the programmable processor to receive the new import entry summary in a format having a field for an account number used to identify the new importer account;

the instruction operable to cause the programmable processor to store the new import transaction entry in the account-based database of customs information includes an instruction operable to cause the programmable processor to organize the new import transaction entry into an account-based format; and the computer program product further comprises instructions operable to cause a programmable processor to:
  identify, for the first time, the new importer account as the importer account to which the new import transaction entry corresponds based on the new import entry summary received in the format having the field for the account number.

24. A system for providing multiple parties access to customs information, the system comprising:

an account-based database of customs information that associates individual import transaction entries with related importer accounts corresponding to one or more importers of goods, wherein the import transaction entries describe import transactions that involve the importation of goods into a country and an individual import transaction entry includes:
  a record of goods imported into the country as part of an individual import transaction, and
  a record of a financial balance due to a customs agency for duties, taxes, or other fees levied by the customs agency on the goods imported into the country as part of the individual import transaction; and the database of customs information associates individual import transaction entries with corresponding importer accounts based on the importers responsible for the import transactions described by the import transaction entries;

a web-based interface configured to receive a non-importer's log-in information; and a processing device configured to:
  verify the non-importer's log-in information;
  receive a request from the non-importer to create a new importer account for a particular importer;
  determine if the particular importer is an importer for whom the non-importer is authorized to act as an agent based on the non-importer's verified log-in information;
  create the new importer account for the particular importer based on a determination that the particular importer is an importer for whom the non-importer is authorized to act as an agent;
  receive a new import entry summary from the non-importer that corresponds to a new import transaction for which the particular importer is responsible, that is related to the new importer account, and that includes:
    an indication of a type of new goods being imported into the country as part of the new import transaction,
    a quantity of the new goods being imported into the country as part of the new import transaction, and
    a declared value of the new goods being imported into the country as part of the new import transaction; and
  in response to receiving the new import entry summary from the non-importer:
    calculate, based on the type, quantity, and declared value of the new goods being imported into the country as part of the new import transaction, a new financial balance due to the customs agency for duties, taxes, or other fees levied by the customs agency on the new goods being imported into the country as part of the new import transaction;
    generate a new import transaction entry tat describes the new import transaction and tat includes:
      a record of the new goods being imported into the country as part of the new import transaction, and
      a record of the new financial balance due to the customs agency for duties, taxes, or other fees levied by the customs agency on the new goods being imported into the country as part of the individual import transaction;
    associate the new import transaction entry with the new importer account; and
    store the new import transaction entry in the account-based database of customs information.

25. The system of claim 24, wherein:

the new import entry summary from the non-importer is in a format having a field for an account number used to identity the new importer account; and the processing device is further configured to:
  identify, for the first time, the new importer account as the importer account to which the new import transaction entry corresponds based on the new import entry summary received in the format having the field for the account number.

26. The method of claim 1 wherein calculating a new financial balance due to the customs agency for duties, taxes, or other fees levied by the customs agency on the new goods being imported into the country as part of the new import transaction comprises:

accessing a harmonized tariff schedule;

retrieving, from the accessed harmonized tariff schedule, a formula that defines a duty for the type of the new goods being imported into the country as part of the new import transaction; and calculating the new financial balance due to the customs agency in accordance with the formula retrieved from the harmonized tariff schedule and based on the type, quantity, and declared value of the new goods being imported into the country as part of the new import transaction.

27. The computer program product of claim 22 wherein the instructions operable to cause the programmable processor to calculate the new financial balance due to the customs agency for duties, taxes, or other fees levied by the customs agency on the new goods being imported into the country as part of the new import transaction include instructions operable to cause the programmable processor to:

access a harmonized tariff schedule;

retrieve, from the accessed harmonized tariff schedule, a formula that defines a duty for the type of the new goods being imported into the country as part of the new import transaction; and calculate the new financial balance due to the customs agency in accordance with the formula retrieved from the harmonized tariff schedule and based on the type, quantity, and declared value of the new goods being imported into the country as part of the new import transaction.

28. The system of claim 24 wherein the processing device is configured to calculate the new financial balance due to the customs agency for duties, taxes, or other fees levied by the customs agency on the new goods being imported into the country as part of the new import transaction by:

accessing a harmonized tariff schedule;

retrieving, from the accessed harmonized tariff schedule, a formula that defines a duty for the type of the new goods being imported into the country as part of the new import transaction; and calculating the new financial balance due to the customs agency in accordance with the formula retrieved from the harmonized tariff schedule and based on the type, quantity, and declared value of the new goods being imported into the country as part of the new import transaction.

\* \* \* \* \*